(12) United States Patent
Power et al.

(10) Patent No.: US 10,537,919 B1
(45) Date of Patent: *Jan. 21, 2020

(54) MAIL HANDLING AUTOMATION AND MONITORING SYSTEMS

(71) Applicant: CapStone Technologies, LLC, Lincoln, NE (US)

(72) Inventors: Troy R. Power, Lincoln, NE (US); Robb Hagen, Lincoln, NE (US); Francis J. Buglewicz, Bellevue, NE (US); Dan Goodkind, Bellevue, NE (US)

(73) Assignee: CapStone Technologies, LLC, Lincoln, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/004,957

(22) Filed: Jun. 11, 2018

Related U.S. Application Data

(63) Continuation of application No. 15/427,258, filed on Feb. 8, 2017, now Pat. No. 9,993,845.

(Continued)

(51) Int. Cl.
*B07C 3/00* (2006.01)
*B65B 5/06* (2006.01)

(Continued)

(52) U.S. Cl.
CPC ............... *B07C 3/008* (2013.01); *B07C 3/00* (2013.01); *B07C 3/14* (2013.01); *B25J 19/021* (2013.01); *B65B 5/067* (2013.01); *B65B 5/068* (2013.01); *B65C 1/00* (2013.01); *B65G 57/24* (2013.01); *G06Q 30/0207* (2013.01);

(Continued)

(58) Field of Classification Search
CPC . B07C 3/008; B07C 2501/0063; B25J 19/021
See application file for complete search history.

(56) References Cited

U.S. PATENT DOCUMENTS 6,434,914 B1 * 8/2002 Bouldin ................... A01G 9/08
221/211
7,309,000 B2 * 12/2007 McDonald ............. G06Q 10/08
235/375

(Continued)

*Primary Examiner* — Thomas Randazzo
(74) *Attorney, Agent, or Firm* — Mallory M. Henninger; Advent, LLP

(57) ABSTRACT

Automated (e.g., robotic) mail tagging, traying, sleeving, and palletizing devices are disclosed. A monitoring system is also disclosed. In embodiments, the monitoring system is configured to operate with (e.g., monitor and/or control) one or more of the automated devices disclosed herein to facilitate actual physical mail matches the digital files provided to the USPS for postage discounts received on same mail. By comparing the digital information regarding the mail item identifier, the tray identifier, and the pallet identifier with the stored physical information received from the one or more scanners; and identifying whether or not any discrepancies exist between the digital information regarding the mail item identifier, the tray identifier, and the pallet identifier and the stored physical information received from the one or more scanners users can ensure actual physical mail matches the digital files submitted to USPS for postage discounts of same mail.

15 Claims, 33 Drawing Sheets

Related U.S. Application Data

(60) Provisional application No. 62/292,660, filed on Feb. 8, 2016.

(51) Int. Cl.
  *B25J 19/02* (2006.01)
  *B65C 1/00* (2006.01)
  *B07C 3/14* (2006.01)
  *G06Q 30/02* (2012.01)
  *B65G 57/24* (2006.01)

(52) U.S. Cl.
  CPC ............... *B07C 2301/0025* (2013.01); *B07C 2301/0075* (2013.01); *B07C 2501/0063* (2013.01)

(56) References Cited

U.S. PATENT DOCUMENTS

| | | | | |
|---|---|---|---|---|
| 7,448,499 B2* | 11/2008 | Roth | ................ | B07C 3/00 209/540 |
| 7,598,863 B2* | 10/2009 | King | ................ | B65G 63/004 340/572.1 |
| 7,741,575 B2* | 6/2010 | Bowers | ................ | B07C 3/00 209/583 |
| 8,245,933 B2* | 8/2012 | Isles | ................ | B07C 3/20 235/435 |
| 8,433,438 B2* | 4/2013 | Gorp | ................ | G06Q 10/00 700/221 |
| 8,457,781 B2* | 6/2013 | Bailey | ................ | B07C 3/00 700/224 |
| 8,598,482 B2* | 12/2013 | Bonnell | ................ | B07C 3/18 209/584 |
| 9,221,640 B2* | 12/2015 | Middleberg | ................ | B65H 31/06 |
| 9,993,845 B1* | 6/2018 | Power | ................ | B07C 3/00 |
| 2005/0011816 A1* | 1/2005 | Zitting | ................ | B07C 3/008 209/584 |
| 2011/0030318 A1* | 2/2011 | Moylan | ................ | B65B 5/04 53/458 |
| 2014/0260115 A1* | 9/2014 | Mayhall, III | ................ | B65B 69/0033 53/492 |

* cited by examiner

Preparation information contained in the Mail.dat data

| Unique Intelligent Mail Piece Barcode | Unique Intelligent Mail Tray Barcode | Unique Intelligent Mail Container Barcode |
|---|---|---|
| Intelligent Mail Barcode ID | IMTB ID | IMCB ID |
| 00041000493000780241 | 37245123100004930000010 | 99P000116PSI-TEST01205I540 |
| 00041000493000780242 | 37245000101 | |
| 00041000493000780243 | 37245000102 | |
| 00041000493000780244 | 37245000103 | |
| 00041 Pieces | 245000104 | Container or Pallet |
| 00041000493000780246 | 37245000105 | |
| 00041000493000780247 | 37245000106 | |
| 00041000493000780248 | 37245000107 | |
| 00041000493000780249 | 37245123100004930000020 | |
| 00041000493000780210 | 37245000100 | |
| 00041 Pieces | 37245000100 | Tray |
| 00041000493000780212 | 37245000100 | |
| 00041000493000780213 | 37245000100 | |
| 00041000493000780214 | 37245000100 | |

FIG. 5

| USPS Mailer Score Card Program | Error Type Metric | # | Validation Type(s) | Manual (Hand Scanners) Inserter | Sorter |
|---|---|---|---|---|---|
| Full Service | MID Container | 1 | P-L | | |
| Full Service | MID HU | 2 | T-L | X | X |
| Full Service | Entry Facility Container | 3 | P-L | | |
| Full Service | Entry Facility HU | 4 | T-L | X | X |
| Full Service | Unlinked Copal | 5 | T-L | X | X |
| Seamless Acceptance | Undocumented | 6 | T-C + T-L + P-C + P-L | X | X |
| Seamless Acceptance | Nesting/Sortation (MPE) | 7 | T-C + T-L | X | X |
| Seamless Acceptance | Nesting/Sortation (Sampling) | 8 | T-C + T-L | X | |
| eInduction | Undocumented (Press) | 9 | P-L | | |
| eInduction | Payment | 10 | P-L | | |
| eInduction | Duplicate (Container) | 11 | P-L | | |
| eInduction | MisShipped Container | 12 | P-L | | |
| eInduction | Entry Point Discount (Piece) | 13 | T-C + T-L + P-C + P-L | X | X |

Pallet validations = 62%
Tray validations = 54%
P+T validations = 15%
Piece validations = 30%

FIG. 6A

USPS Mailer ScoreCard Metrics...and Methods to positively impact

| | Manual (Hand Scanners) | | | | Trayer | Tagger | Sleever | Palletizer | 99% USPS MSC Value | Risk Factor |
|---|---|---|---|---|---|---|---|---|---|---|
| Press | Sleeving | Pallet Build | Pallet Placard | Shipping | | | | | | |
| X | XX | | X | XX | | | | X | 102 | 2.33 |
| | | | | | | X | | X | 82 | 2.00 |
| X | XX | | X | XX | | | | | 102 | 2.33 |
| X | XX | | | | | X | | | 82 | 2.00 |
| X | XX | X | X | XX | X | X | | X | 79 | 2.83 |
| X | XX | | | | X | | XX | | 104 | 4.95 |
| | | | | | X | | XX | | 83 | 3.54 |
| | | | X | XX | | | | X | 80 | 3.13 |
| | | | X | XX | | | | X | 104 | 2.33 |
| | | | X | XX | | | | X | 104 | 2.33 |
| | | X | X | XX | | | | X | 103 | 2.67 |
| X | XX | | | | X | | XX | X | tbd | 2.83 |
| | | | | | | | | | tbd | tbd |

FIG. 6B

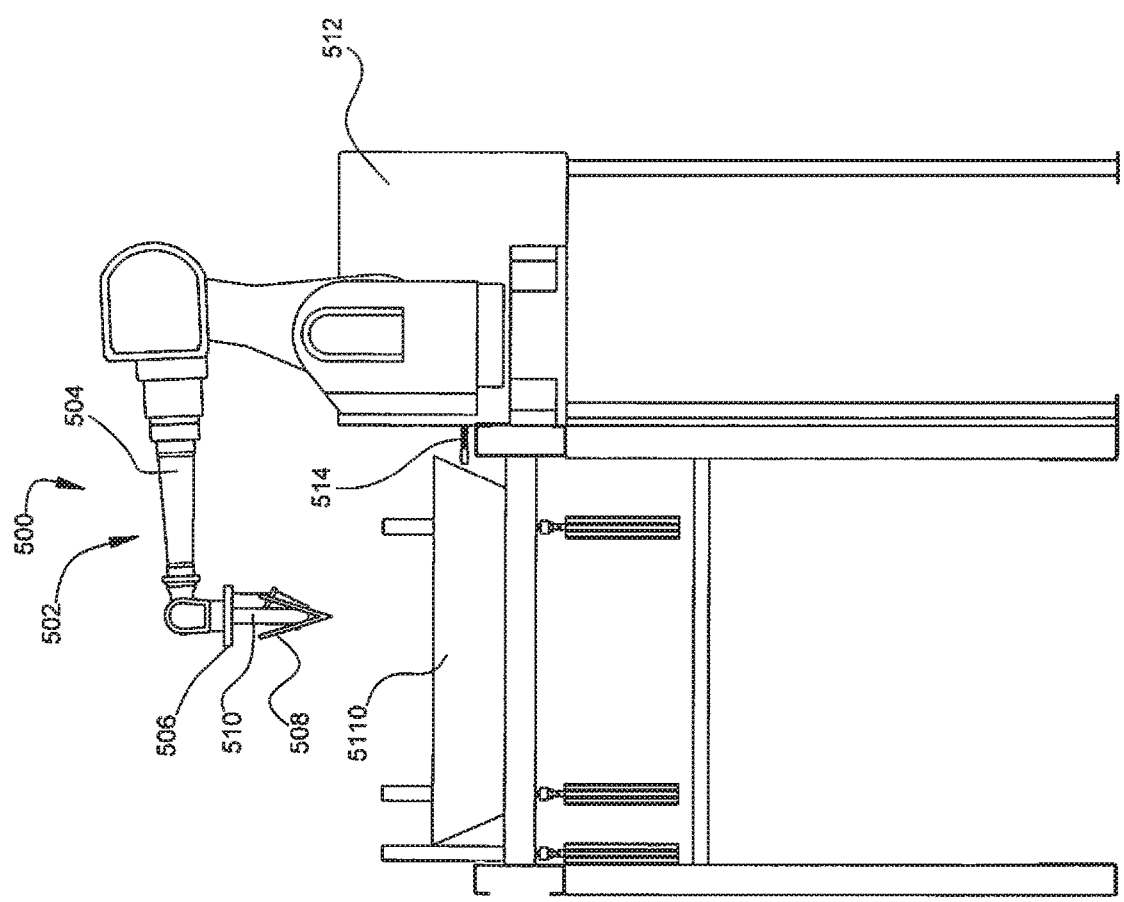

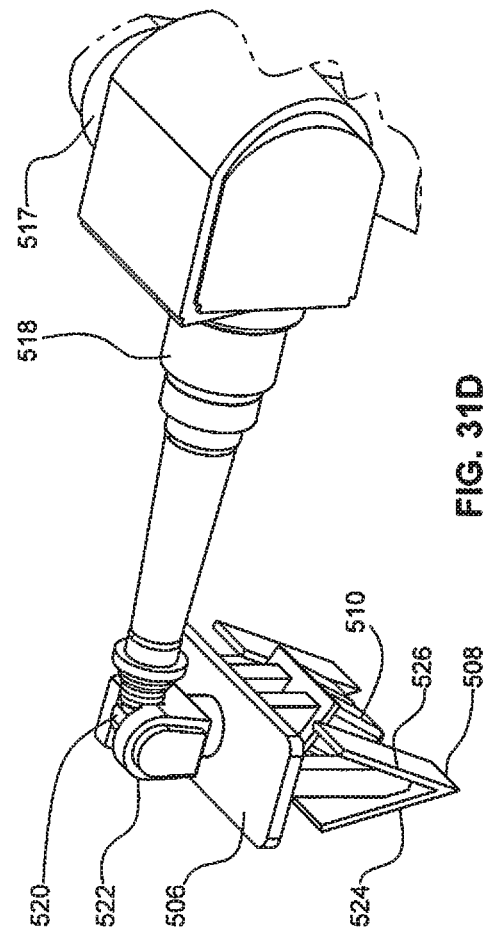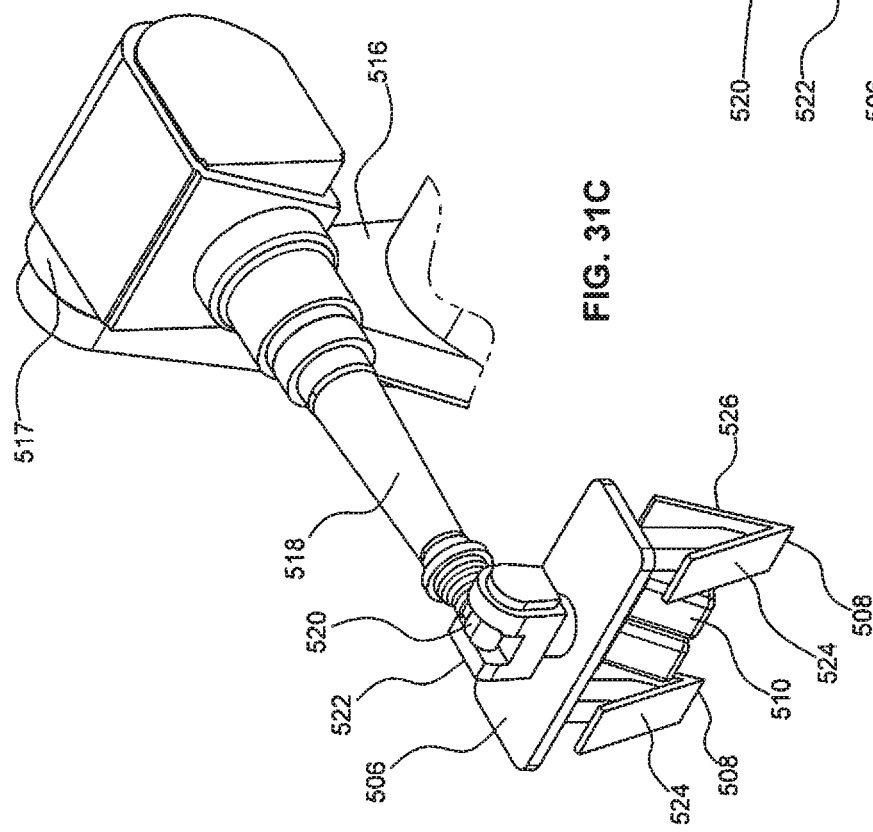
FIG. 31C
FIG. 31D

MAIL HANDLING AUTOMATION AND MONITORING SYSTEMS

CROSS-REFERENCE TO RELATED APPLICATIONS

The present application is a continuation under 35 U.S.C. § 120 of U.S. patent application Ser. No. 15/427,258, filed Feb. 8, 2017, and titled "MAIL HANDLING AUTOMATION AND MONITORING SYSTEMS," which claims the benefit under 35 U.S.C. § 119(e) of U.S. Provisional Application No. 62/292,660, filed Feb. 8, 2016, and titled "MAIL HANDLING AUTOMATION AND MONITORING SYSTEMS," each of which is incorporated herein by reference in its entirety.

BACKGROUND

In 1979, the U.S. Postal Service ("USPS") began granting postage rate discounts to mailers who shared mail processing and transportation activities with the USPS. According to a recent assessment of worksharing published by the USPS Inspector General ("OIG"), the USPS provided $15 billion in postage rate discounts to large mailers in 2008. These discounts were tied to worksharing arrangements that covered 80% of total mail volume in that year. These arrangements require producers to deliver pre-sorted and labeled mail trays (e.g., trays, tubs, and other mail receptacles) and pallets (e.g., platforms or stackable structures that can support a plurality of trays and/or large mail items/pieces) as close as possible to the final destination Post Office or USPS Distribution Center. The finer the mail sort and the closer to the final destination it is delivered, the greater the discount given to producers by the USPS.

The USPS OIG estimated that these $15 billion in discounts represented reduced costs of only $10.7 billion when the mailers' cost to workshare was considered. Therefore the USPS must address an annual $4.3 billion postage discount deficit, approximately 33% "loss" annually. One method the USPS will use to address the $4.3 billion annual workshare deficit is by addressing workshare failures largely attributed to mail being incorrectly delivered by mailers into the USPS mail stream destinations. The root cause of such induction failures is an operational gap between the physical and digital elements in the mailer production operations. This root cause effectively allows the actual physical mail to differ from the digital files provided to the USPS for postage discounts received on same mail. Prior to 2013, this shortfall was not truly a problem for mailers because the USPS could not identify workshare protocol failures early enough in its sample-based process to clearly identify the mailer as the source of error. The print-to-mail industry currently faces tremendous risks to the $15 billion annual discounts as a result of pending USPS mandates including the Intelligent Mail Barcode ("IMB"), Seamless Acceptance, eInduction, Full-Service, and the Mailer ScoreCard initiatives.

The newly implemented USPS IMB, Mailer ScoreCard, Seamless Acceptance and related systems collectively create unprecedented visibility into the USPS mailstream, and represent the potential loss of billions of dollars annually in postage rate discounts by mailers to which workshare performance failures can now be traced, and from whom unearned postage discounts can now be reclaimed by the USPS. The IMB captures unique identifiers on mail items, mail trays and mail pallets which in conjunction with related USPS initiatives, creates a fundamental change by now providing essentially 100% visibility (was essentially 0%) and real time insight into the quality of mail preparation and compliance with Postal Service requirements. The new mandates and resulting ability of the USPS to track mail item, mail tray and mail pallet quality to individual mailers throughout the mailstream will allow the Postal Service to address the operating losses attributable to underperforming workshare discount programs.

In the 2011 USPS Annual Compliance Determination Report, 62% of the combined First and Standard Class workshare programs were failing, thus providing discounts greater than the costs avoided. The USPS has a new reporting system called the "Mailer Scorecard." Mailers are now getting scored on how well or poorly they are performing when processing mailings using USPS programs. The Scorecard provides a complete performance summary and mailers can easily view the metrics on a dashboard by logging in through the USPS Business Customer Gateway. Each month, the USPS will use the Scorecard to examine the performance across multiple metrics from the previous calendar month to evaluate whether the established mail quality thresholds are met for each metric. If mail quality thresholds are surpassed, an invoice will be generated as a penalty 10 days after the end of the month. Mailers will have an opportunity to review the invoicing reports and request a review if they feel any of the penalties is a USPS mistake.

SUMMARY

Aspects of this disclosure are directed toward ensuring actual physical mail matches the digital files provided to the USPS for postage discounts received on same mail via automated mail handling and monitoring systems to improve compliance with USPS intelligent mailing requirements and reduce labor costs associated with highly repetitive, manual, error-prone tasks throughout high volume mailing operations.

A monitoring system is disclosed. In embodiments, the monitoring system is configured to operate with (e.g., monitor and/or control) one or more of the automated devices disclosed herein to ensure actual physical mail matches the digital files provided to the USPS for postage discounts received on same mail. For example, the monitoring system may be communicatively coupled with one or more of the automated devices to provide monitoring and/or control at the one or more corresponding mail handling operations. In some embodiments, the monitoring system is additionally or alternatively configured to operate with user-driven devices (e.g., handheld scanners, cameras, or other sensors) and/or user monitoring devices (e.g., surveillance cameras) to provide monitoring for manual or semi-automated mail handling operations. The monitoring system can therefore be implemented in automated, semi-automated, and manually carried out mailing operations.

Automated (e.g., robotic) mail tagging, traying, sleeving, and palletizing devices are also disclosed. In embodiments, an automated mail handling system can include all of the automated devices disclosed herein. In other embodiments, a mail handling system (i.e., partially automated system) only includes one or more of the automated devices.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures. The use of the same reference numbers in different instances in the description and the figures may indicate similar or identical items.

FIG. 5 shows an example text file (e.g., mail.dat file) with mail item, tray, and pallet identification info (e.g., IMBs).

FIG. 6A shows an example of USPS mailer scorecard metrics that can be impacted by the mail monitoring system in manual and automated (or semi-automated) mail handling system implementations.

FIG. 6B shows an example of USPS mailer scorecard metrics that can be impacted by the mail monitoring system in manual and automated (or semi-automated) mail handling system implementations.

FIG. 30 is a side view of an automated mail tray tagger in accordance with an embodiment of this disclosure.

FIG. 31C is a partial perspective view of an automated mail tray tagger in accordance with an embodiment of this disclosure.

FIG. 31D is a partial perspective view of an automated mail tray tagger in accordance with an embodiment of this disclosure.

DETAILED DESCRIPTION

Overview

Figure 1:
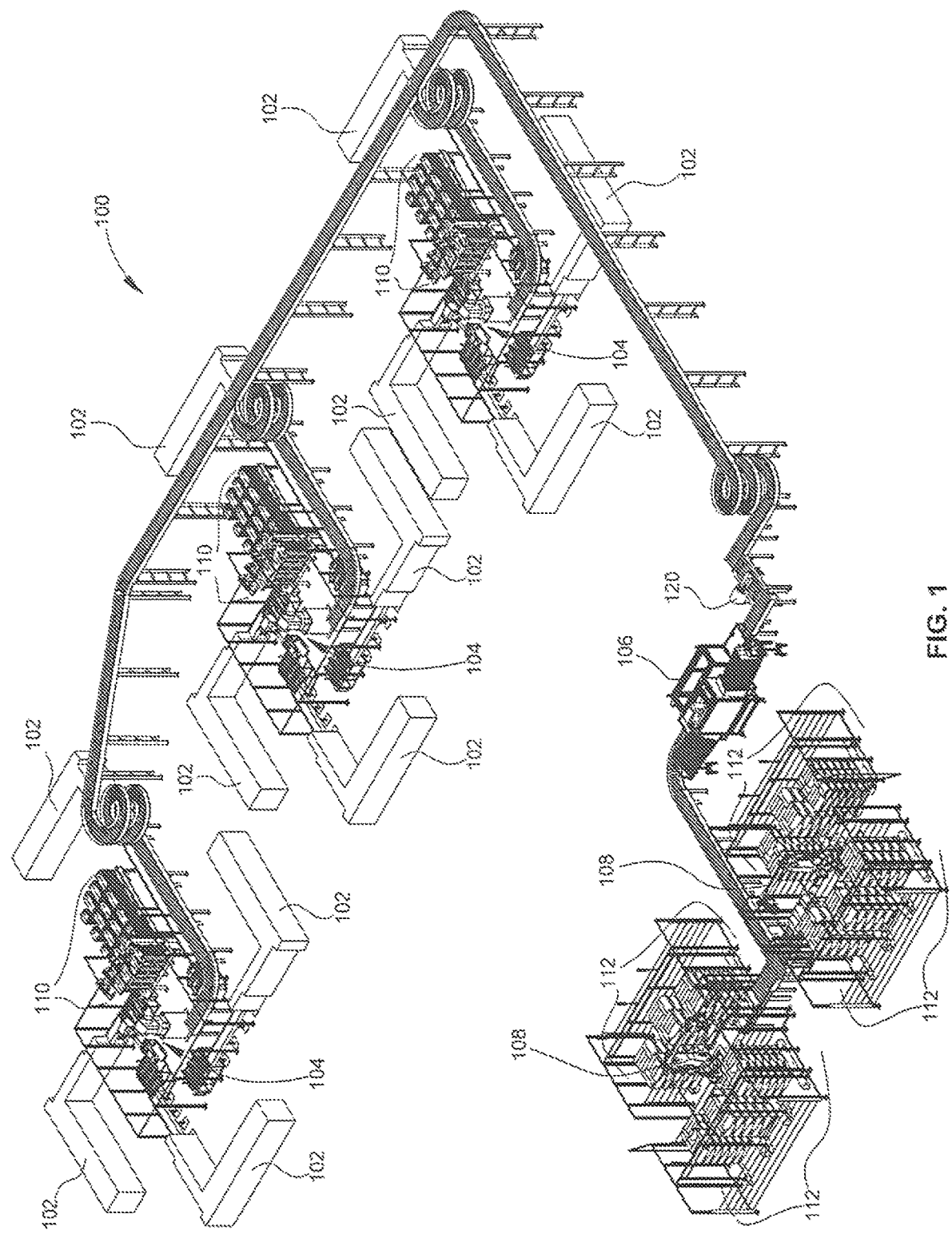
FIG. 1 is schematic of an automated mail handling system in accordance with an embodiment of this disclosure.

Aspects of this disclosure are directed toward ensuring actual physical mail matches digital files provided to the USPS for postage discounts received on same mail via automated mail handling and monitoring systems to improve compliance with USPS intelligent mailing requirements and reduce labor costs associated with highly repetitive, manual, error-prone tasks throughout high volume mailing operations. New USPS mandates are exposing a gaping hole in the mail value stream—namely the gap between its physical and digital elements—which leads to the actual physical mailing not matching the digital documentation submitted to the USPS for postage discounts. As a result, the USPS must rework mail for which the USPS has already provided workshare postage discounts. This physical-digital gap has existed for years but must be addressed by the industry to preserve its $15 billion annual postage discounts from the USPS, not to mention the additional value recognized by mailers from labor, productivity, and error impacts.

Now with the unprecedented 100% visibility into the mailstream provided via new IMb, Mailer ScoreCard, Seamless Acceptance, eInduction, and related mandates, the USPS will begin assessing fines on unearned postage discounts from workshare failures in the near future. Per the Mailer ScoreCard mailers will now be graded on each of multiple performance metrics (FIGS. 6A and 6B) with fines assessed for failure to meet minimum USPS established thresholds. As such, industry participants are highly motivated to both reduce the risk of errors and prove out their performance relative to their workshare discounts in a fully documented manner.

Automated (e.g., robotic) mail tagging, traying, sleeving, and palletizing devices are disclosed herein. In embodiments, an automated mail handling system can include all of the automated devices disclosed herein. In other embodiments, a mail handling system (i.e., partially automated system) only includes one or more of the automated devices with some tasks being performed manually or in a semi-automated (e.g., operator assisted) fashion.

A monitoring system is also disclosed. In embodiments, the monitoring system is configured to operate with (e.g., monitor and/or control) one or more of the automated devices disclosed herein to capture IMb data (e.g. a mail item, mail tray, and/or pallet identifier) of actual physical mail so as to ensure the digital file submitted to USPS matches same mail, thus avoiding penalties. For example, the monitoring system may be communicatively coupled with one or more of the automated devices to provide monitoring and/or control at the one or more corresponding mail handling operations. In some embodiments, the monitoring system is additionally or alternatively configured to operate with user-driven devices (e.g., handheld scanners, cameras, or other sensors) and/or user-monitoring devices (e.g., surveillance cameras) to provide monitoring for manual or semi-automated mail handling operations.

Current USPS standards and/or programs such as IMB, Mailer ScoreCard, Seamless Acceptance, eInduction and related initiatives for mail item/piece, mail tray, and mail pallet identifiers may change and/or evolve as USPS changes its operational processes, but the systems and methods disclosed herein will remain applicable for ensuring the actual physical mail matches the digital files submitted to USPS for postage discounts of same mail.

Example Implementations

Figure 2:
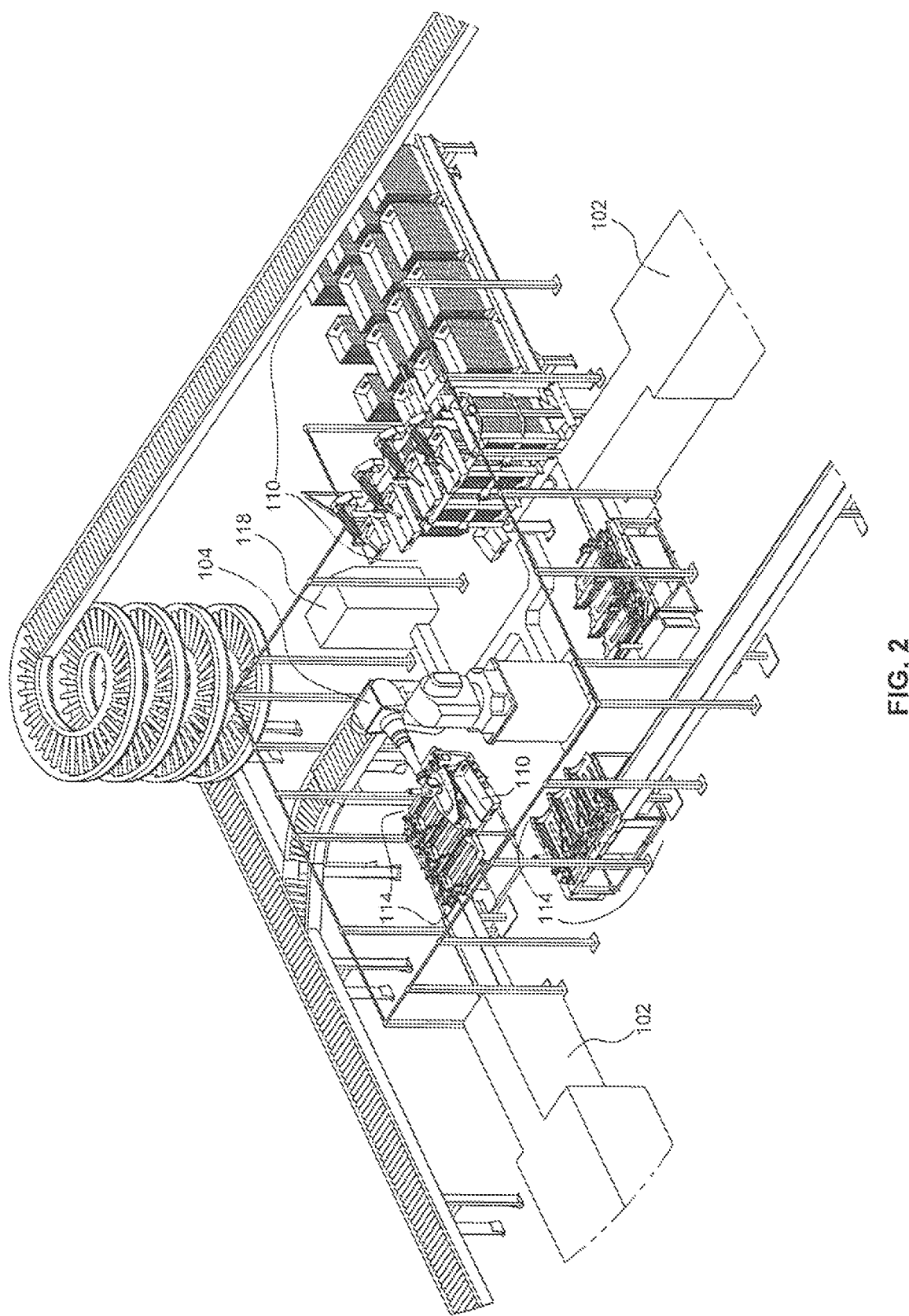
FIG. 2 is schematic of an automated mail trayer in accordance with an embodiment of this disclosure.
Figure 3:
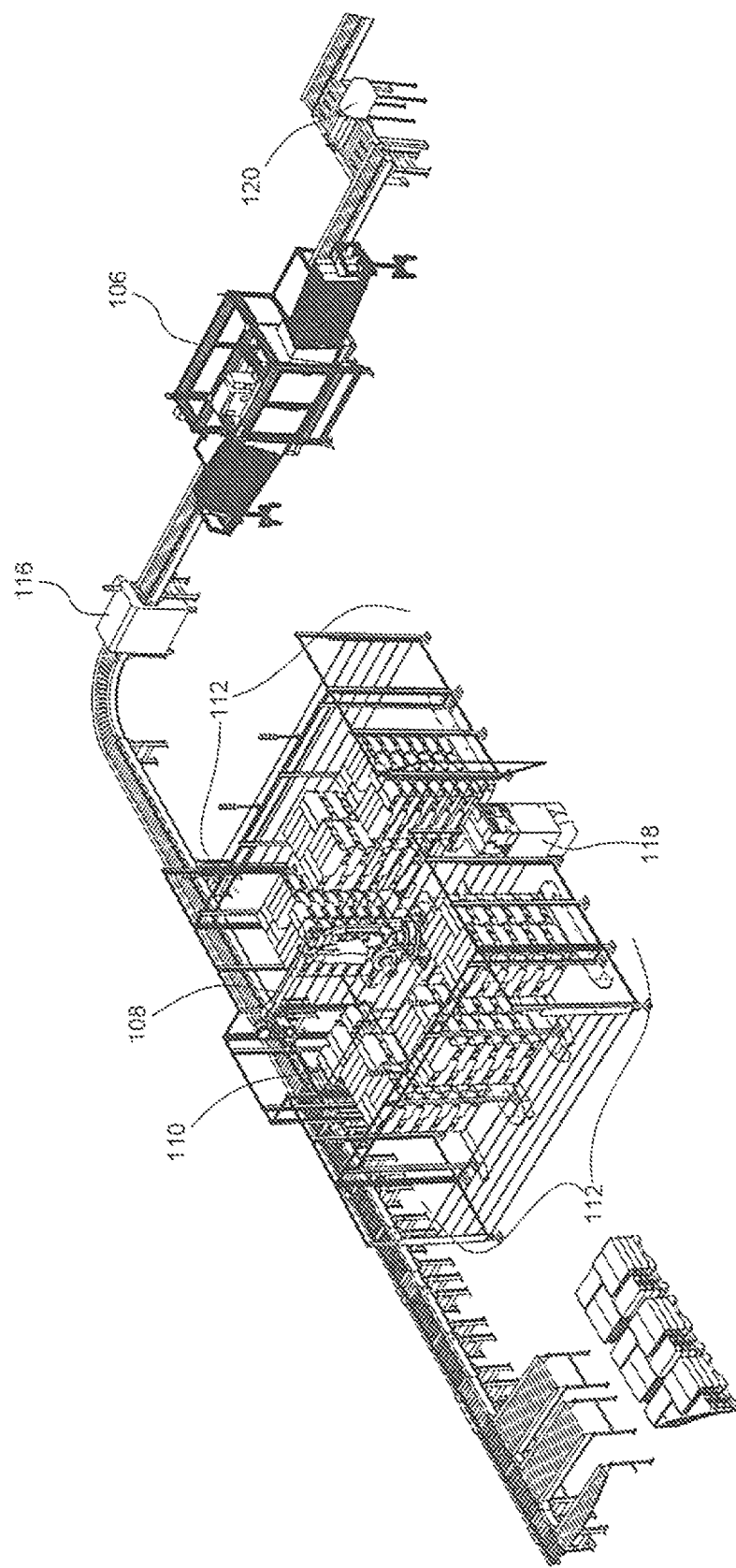
FIG. 3 is schematic of an automated tagger, an automated mail tray sleever, and an automated mail palletizer in accordance with an embodiment of this disclosure.

FIGS. 1 through 3 illustrate an automated mail handling system 100 in accordance with various embodiments of this disclosure. Those skilled in the art will appreciate that the embodiments illustrated in the drawings and/or described herein may be modified or fully or partially combined to result in additional embodiments. Accordingly, the illustrated and described embodiments should be understood as explanatory and not as limitations of the present disclosure.

In FIG. 1, the automated mail handling system 100 is shown to include a conveyance system (e.g., conveyer belts, ramps, slides, etc.) connecting stations for mail traying, tagging, sleeving, and palletizing. For example, mail items (e.g., envelopes, packages, printed materials, etc.) are introduced by one or more inserters (could also be sorters and/or printer press) 102. The system includes one or more mail traying devices 104 (sometimes referred to as "trayers") configured to place the mail items into appropriately sized trays 110. The conveyance system presents the trays to a mail tray tagging device 120 (sometimes referred to as a "tagger") that scans one or more mail items in the tray to then apply a tag on each tray 110 according to its mail items therein. The conveyance system presents the trays to a mail tray sleeving device 106 (sometimes referred to as a "sleever") that is configured to place a sleeve around each tray 110. The sleeved trays 110 are then arranged in pallets 112 by a palletizing device 108 (sometimes referred to as a "palletizer").

The system 100 can be fully (or substantially fully) automated, including at least one trayer 104, at least one tagger 120, at least one sleever 106, and at least one palletizer 108. Any number of the foregoing devices can be implemented depending on system requirements. In some embodiments, the system 100 can be partially automated (i.e., semi-automated) with one or more of the foregoing devices. For example, a semi-automated mail handling system may include a trayer 104 and sleever 106 with manual arrangement of pallets. This example is provided for illustrative purposes only, showing that the system 100 can operate with any or all of the devices (i.e., trayer 104, tagger 120, sleever, 106, palletizer 108) described herein.

In embodiments, a monitoring system is configured to operate with (e.g., monitor and/or control) one or more of the automated devices disclosed herein to facilitate actual physical mail matches the digital files provided to the USPS for postage discounts received on same mail. By comparing the digital information regarding the mail item identifier, the tray identifier, and the pallet identifier with the stored physical information received from the one or more scanners; and identifying whether or not any discrepancies exist between the digital information regarding the mail item identifier, the tray identifier, and the pallet identifier and the stored physical information received from the one or more scanners users can ensure actual physical mail matches the digital files submitted to USPS for postage discounts of same mail. For example, the monitoring system may be communicatively coupled with one or more of the automated devices to provide monitoring and/or control at the one or more corresponding mail handling operations. In some embodiments, the monitoring system is additionally or alternatively configured to operate with user-driven devices (e.g., handheld scanners, cameras, or other sensors) and/or user-monitoring devices (e.g., surveillance cameras) to provide monitoring for manual or semi-automated mail handling operations.

FIG. 2 is a zoomed-in view of the traying device 104 showing its operation in greater detail. In implementations, mail items are introduced by one or more inserters (could also be sorters and/or printer press) 102 and collected by tray break in one or more stacker bins. The traying device 104 includes a mechanical (e.g., robotic) arm that is configured to remove an appropriately sized tray 110 from a tray de-nester. The mechanical arm then positions the empty tray 110 adjacent to a full stacker bin 114 and sweeps its contents (i.e., mail items) into the tray 110. The mechanical arm then places the tray 110 onto a conveyer belt (of the conveyance system) for transport to a tagging and/or sleeving station.

Example implementations of the traying device 104 are also disclosed in U.S. Pat. No. 7,381,026, entitled "Mail Traying Apparatus," which is incorporated herein by reference in its entirety. Embodiments of the mail traying device 104 can include any of the embodiments described in U.S. Pat. No. 7,381,026 or any portions thereof.

Figure 7:
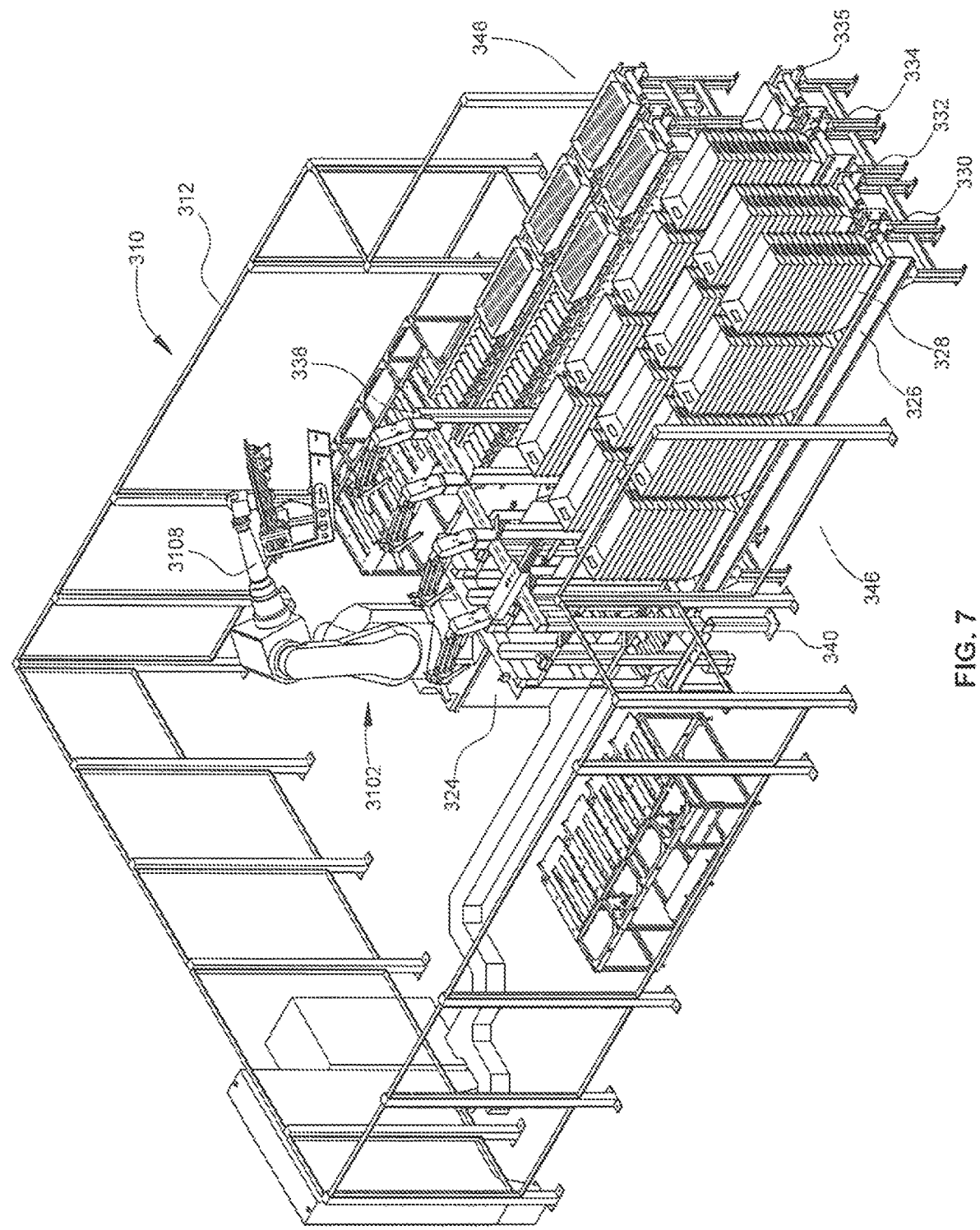
FIG. 7 is a partial perspective view of an automated mail trayer in accordance with an embodiment of this disclosure.
Figure 8:
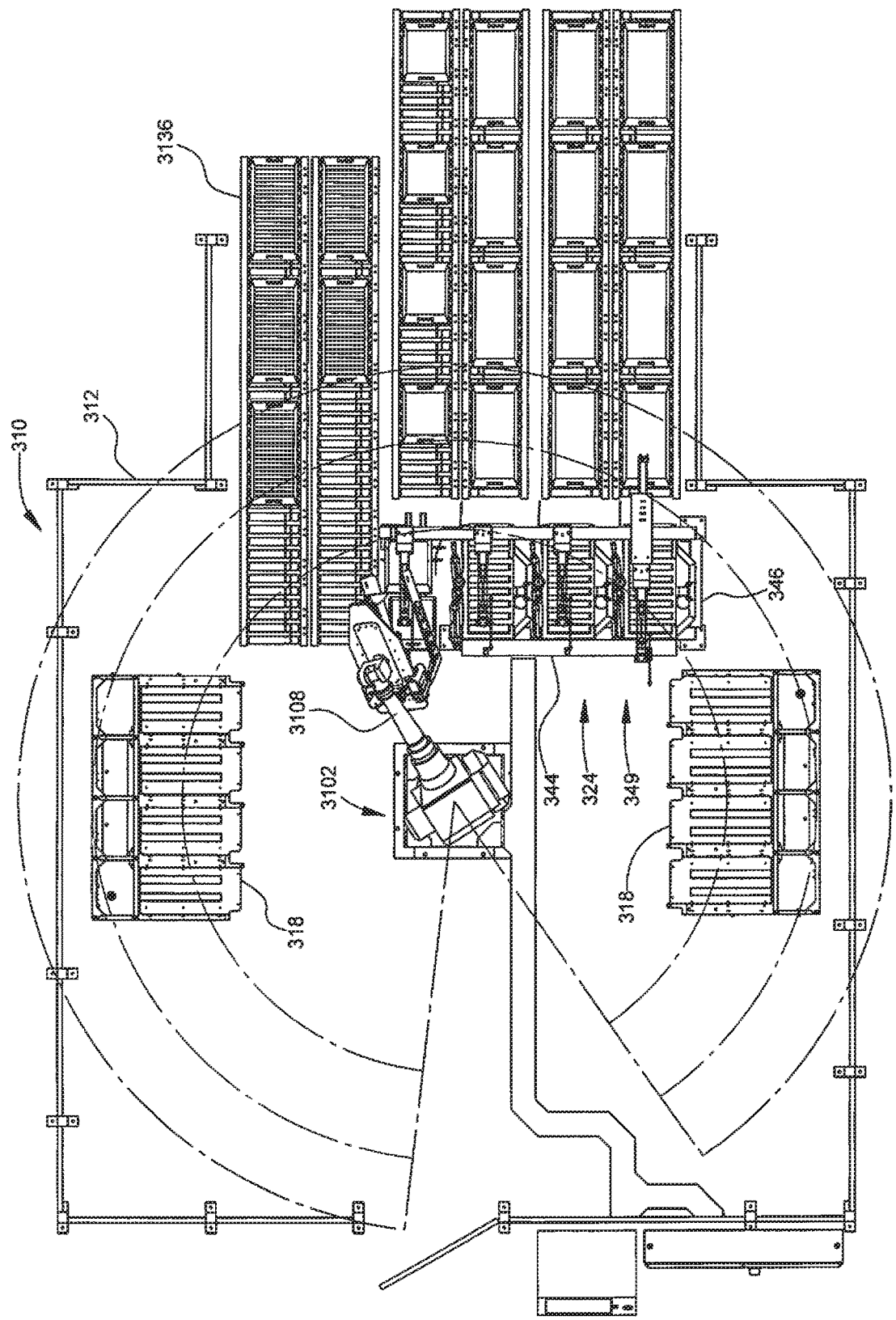
FIG. 8 is a top view of an automated mail trayer in accordance with an embodiment of this disclosure.
Figure 9:
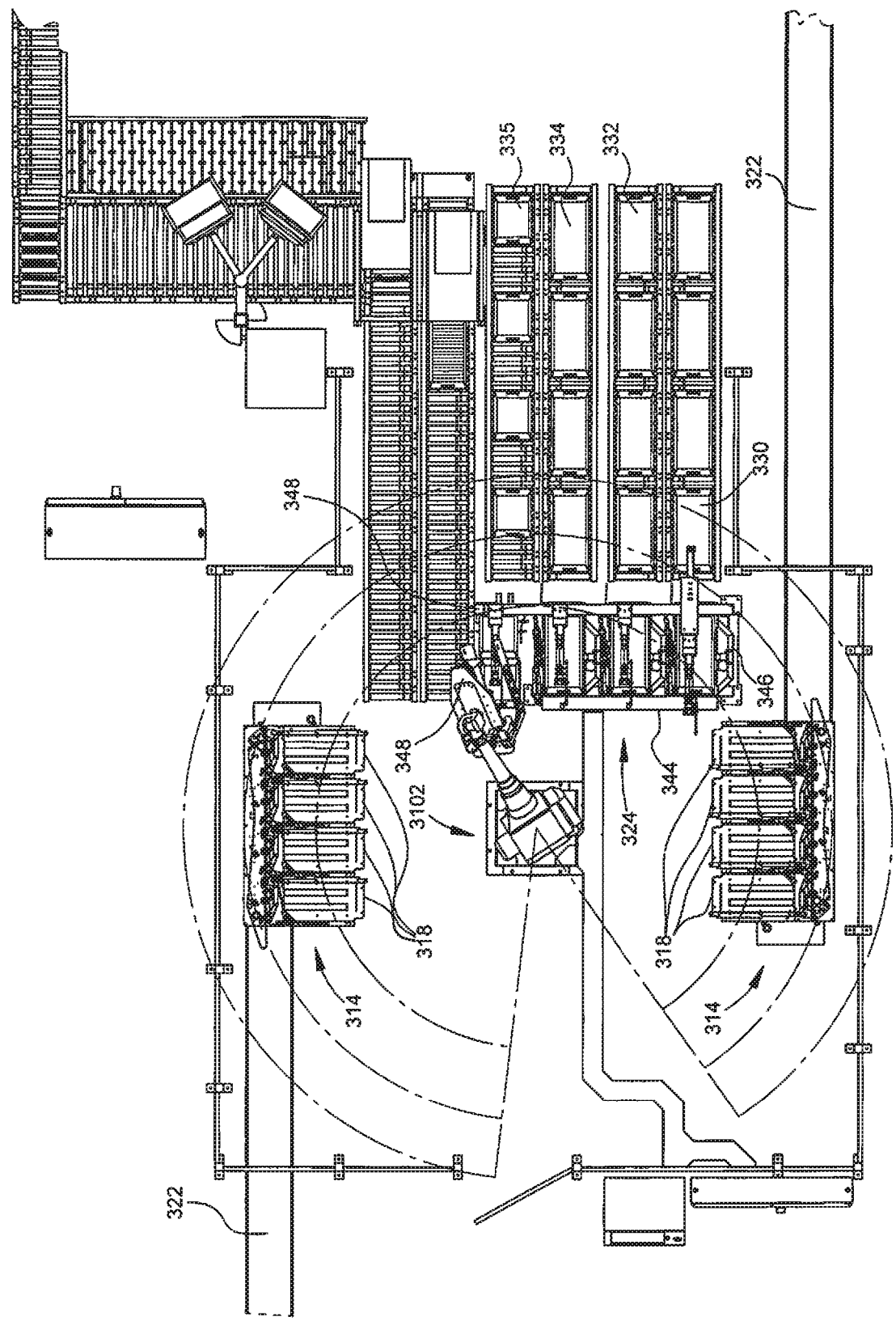
FIG. 9 is a top view of an automated mail trayer in accordance with an embodiment of this disclosure.
Figure 10:
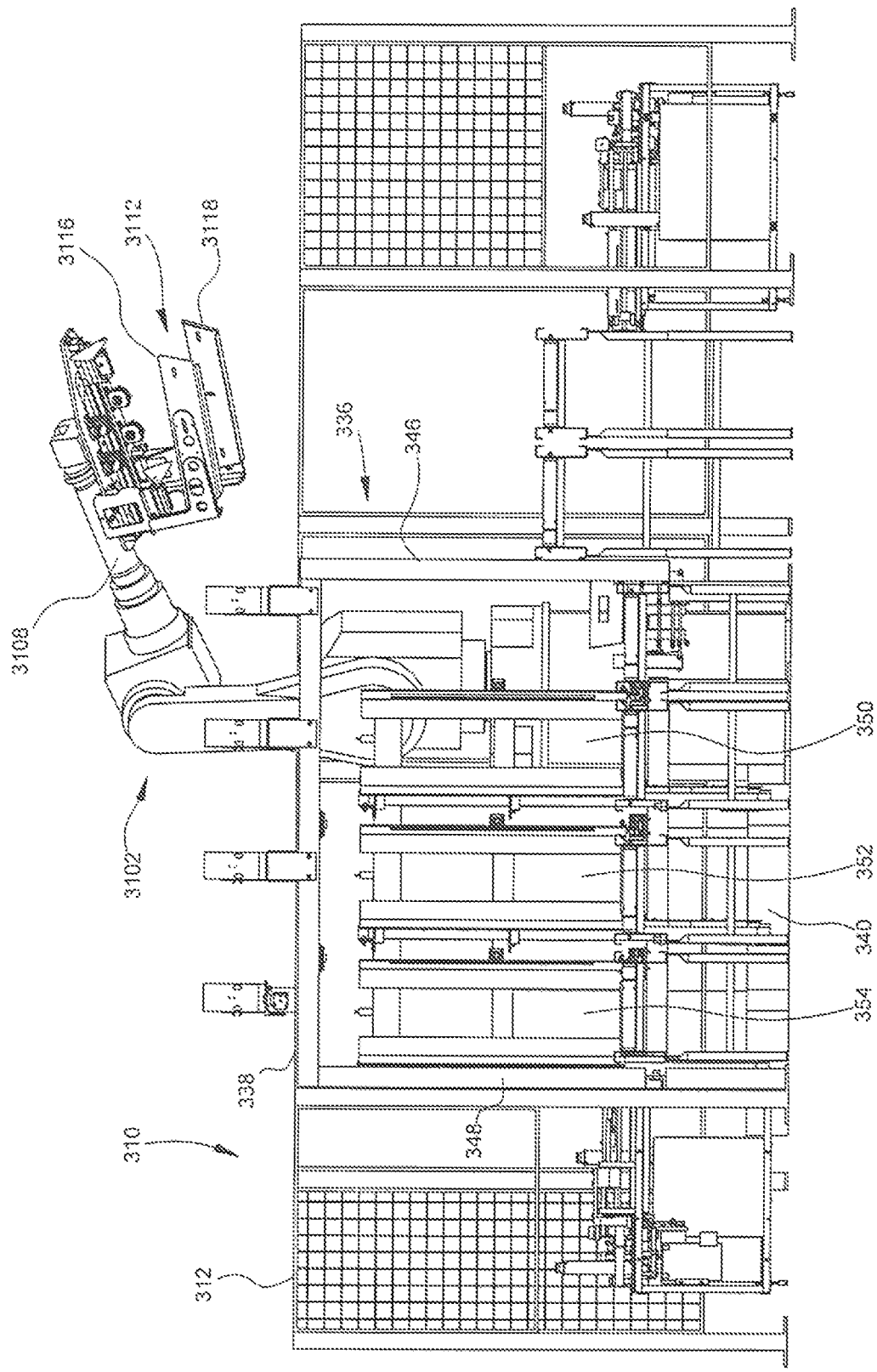
FIG. 10 is a partial front view of an automated mail trayer in accordance with an embodiment of this disclosure.
Figure 11:
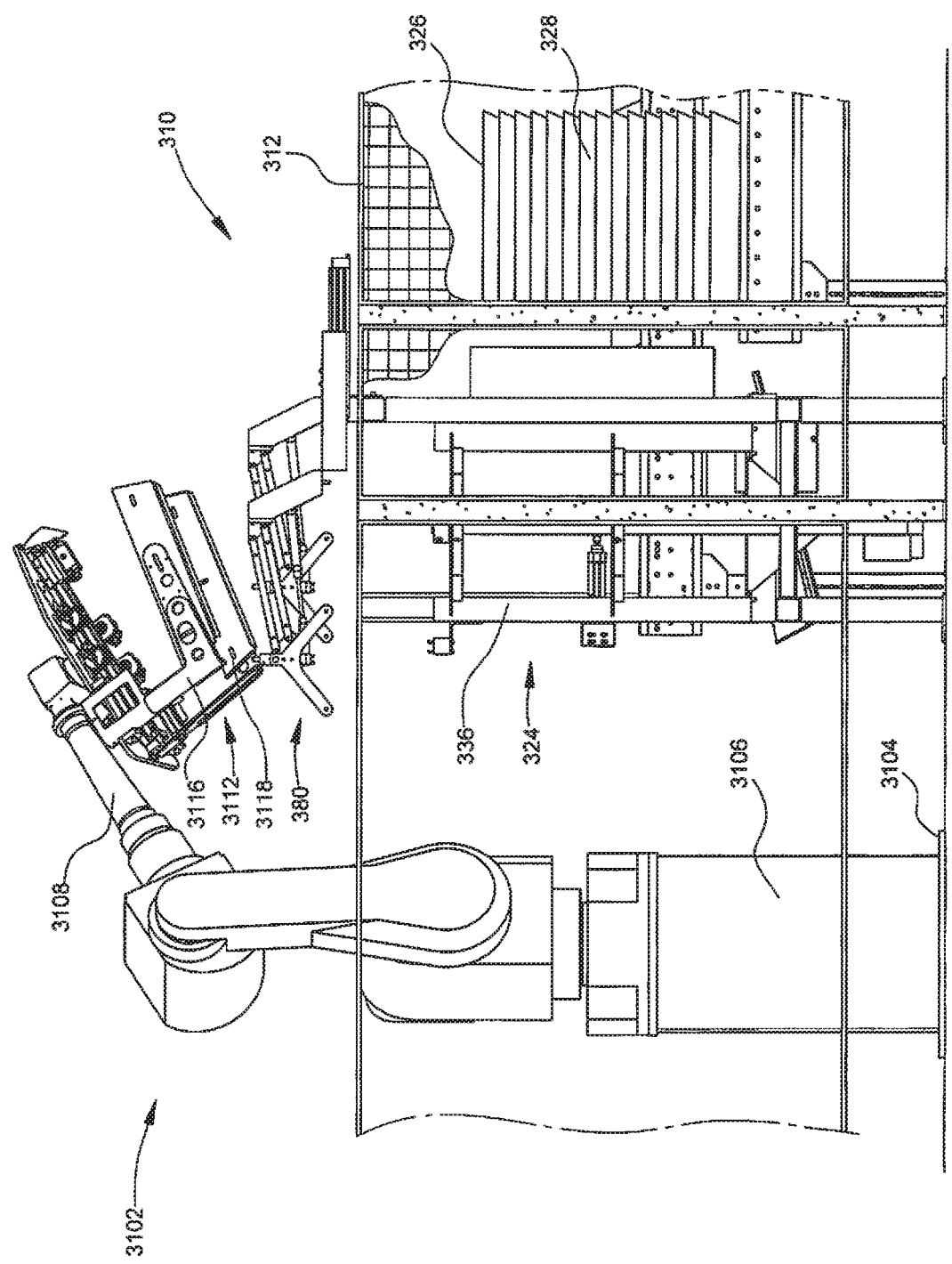
FIG. 11 is a partial side view of an automated mail trayer in accordance with an embodiment of this disclosure.
Figure 12:
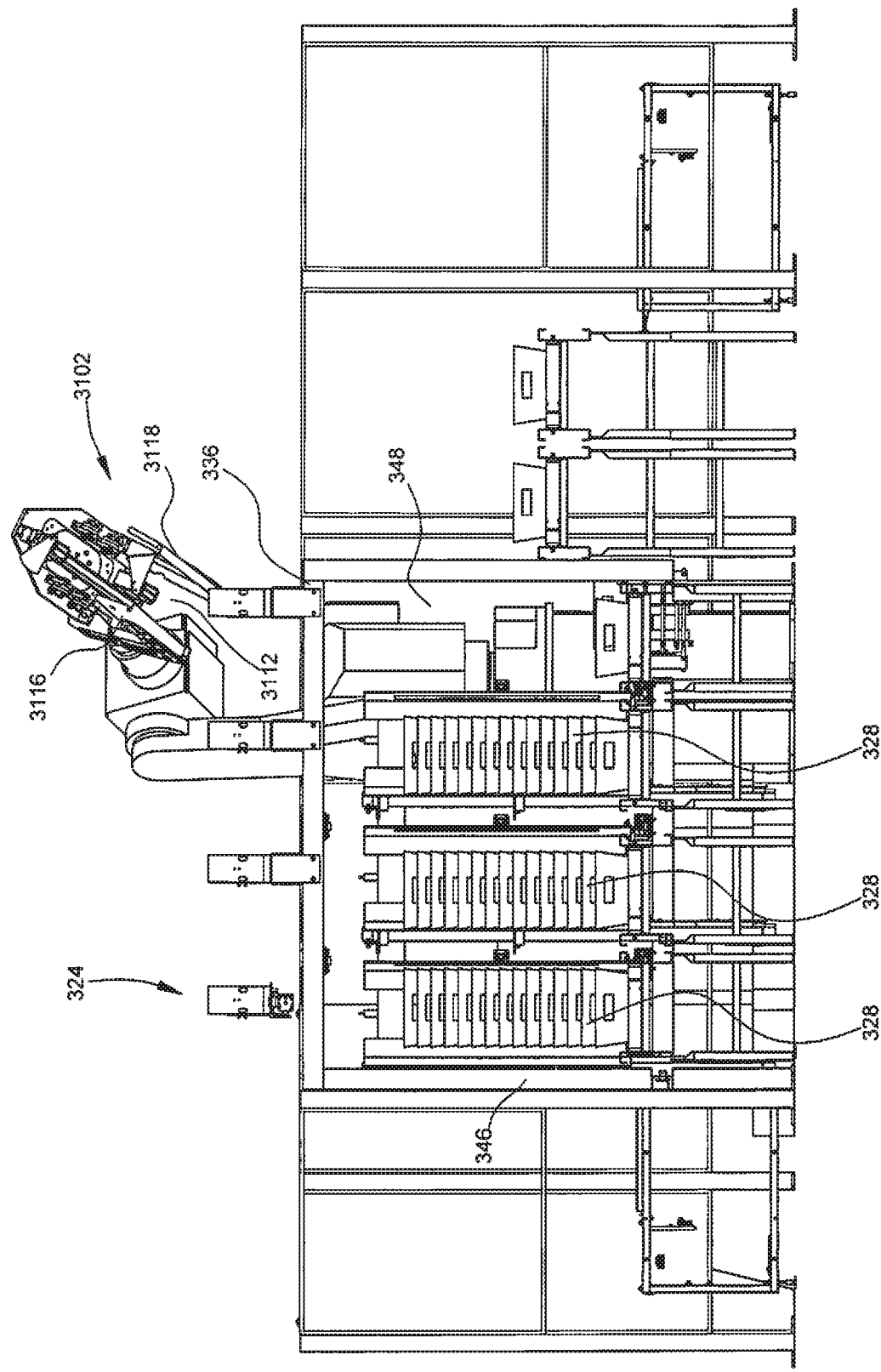
FIG. 12 is a partial rear view of an automated mail trayer in accordance with an embodiment of this disclosure.
Figure 13:
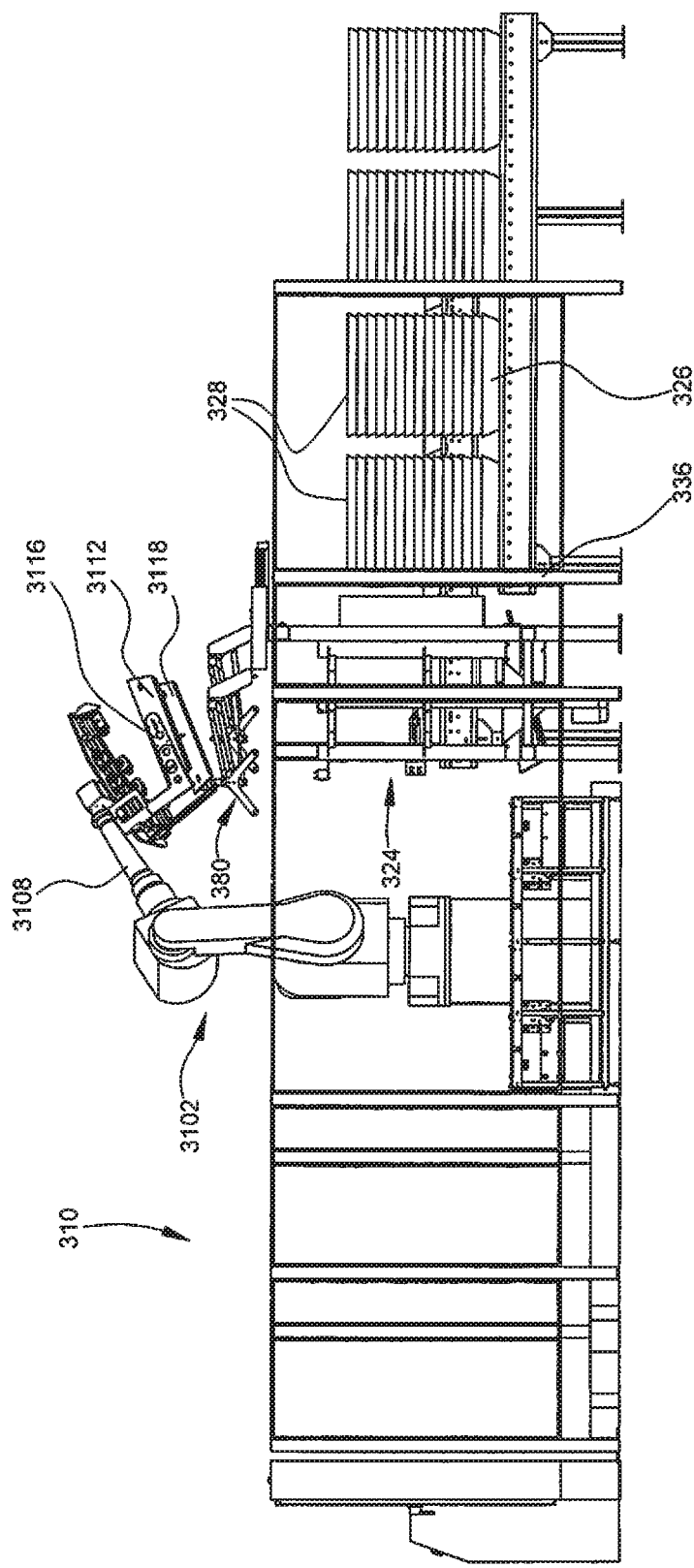
FIG. 13 is a partial side view of an automated mail trayer in accordance with an embodiment of this disclosure.

Referring now to FIGS. 7 through 14, a mail traying subsystem (MTS) 310 (an embodiment of mail traying device 104) may include an enclosure 312 which extends around most of the components thereof for safety purposes. MTS 310 also includes two conventional mail processing machines 314 (FIG. 9), each of which collates filled mail envelopes in a collator and feeds the same into a plurality of mail stacking bins 318 which are supported above the floor of the enclosure 312. The mail envelopes 320 are stacked in the stacking bins 318 so as to be standing on edge. Preferably, the machines 314 are positioned in the enclosure 312, as depicted in FIG. 7. Although FIG. 7 illustrates that a pair of mail processing machines 314 are utilized, a single mail processing machine or any number (e.g., three, four, etc.) of mail processing machines can be used. Conveyors 322 feed the mail envelopes to respective ones of the machines 314 (FIG. 9).

MTS 310 also preferably includes a mail tray denester 324 which de-nests empty mail trays 326 from stack 328 of mail trays supplied to the denester 324 by means of conveyors 330, 332 and 334. Conveyor 335 may also be utilized in the system to supply individual trays to the system, but conveyor 335 does not form a part of the denester 324. Denester 324 is provided with an upstanding frame 336 having an upper end 338, lower end 340, an open rearward side 342, a forward side 344, and opposite sides 346, 348. Frame 336 defines a plurality of cells 350, 352 and 354, each of which is adapted to receive a stack 328 of mail trays 326 therein. Although three cells are illustrated, any number of cells may be utilized.

Figure 14:
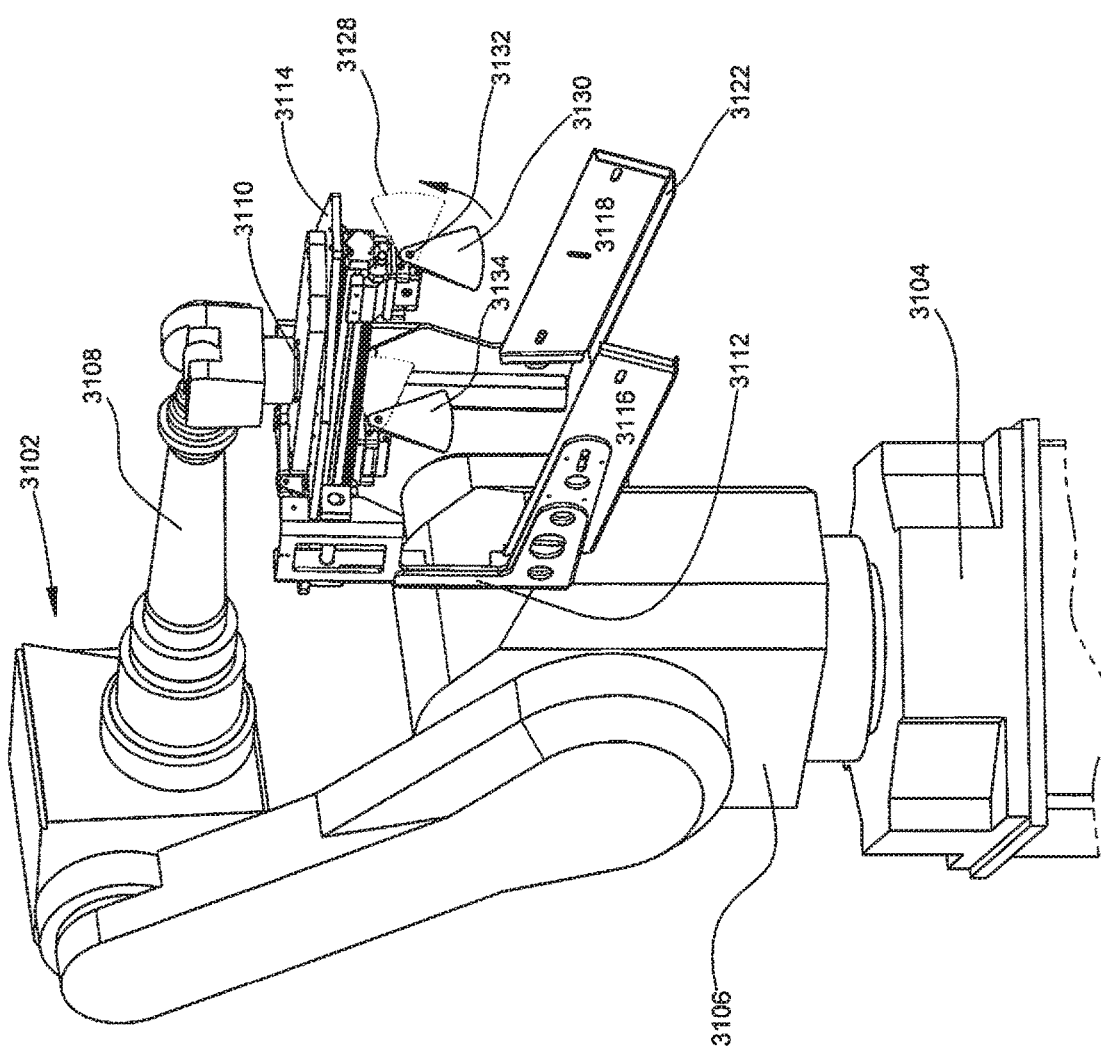
FIG. 14 is a perspective view of a robotic assembly, mail support and mail sweeper of an automated mail trayer in accordance with an embodiment of this disclosure.
Figure 15:
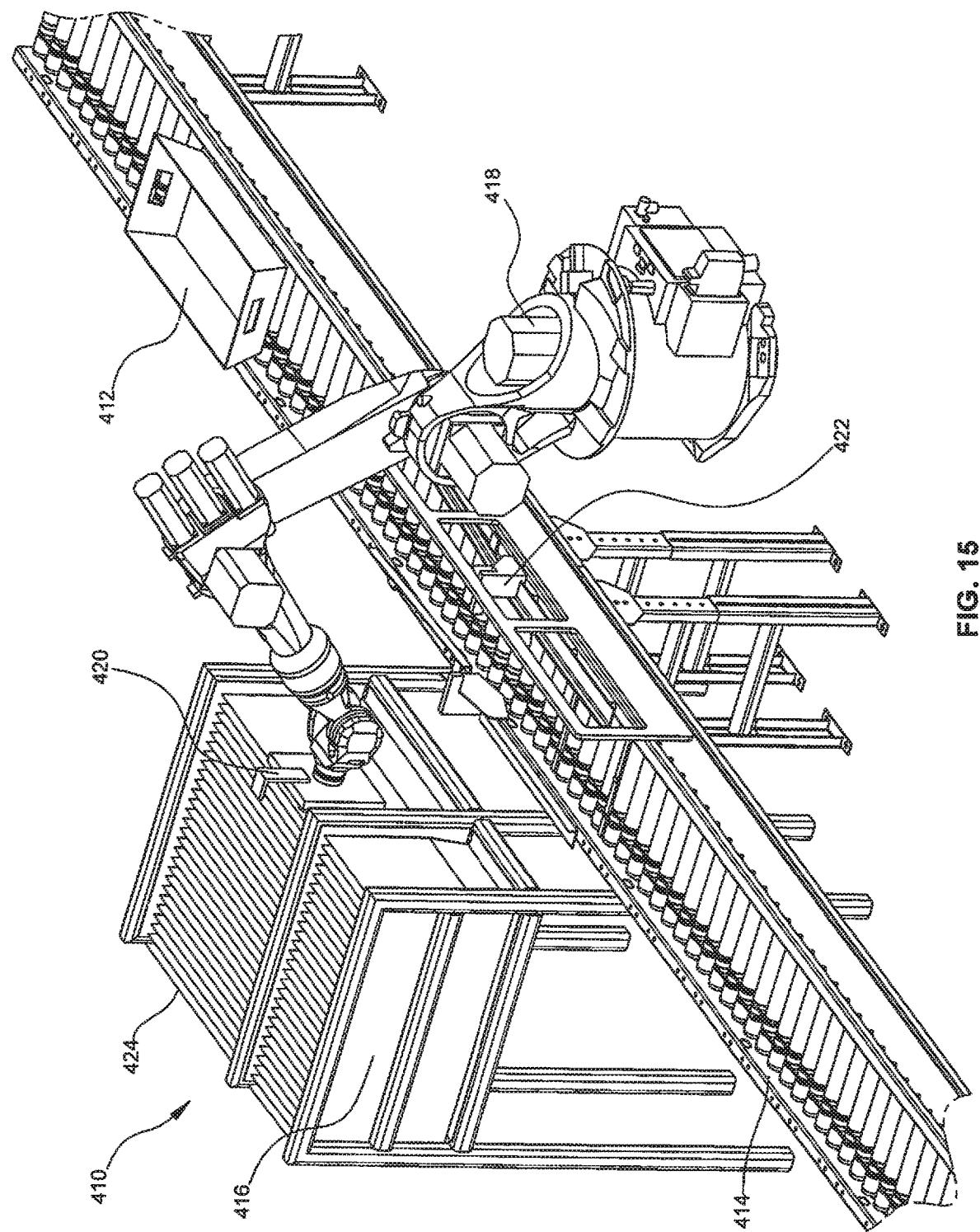
FIG. 15 is a perspective view of an automated mail tray sleever in accordance with an embodiment of this disclosure.

The numeral 3102 refers to a conventional robot including a controller and computer or processor of conventional design. Robot 3102 includes a base 3104 supported upon a floor, a pedestal 3106 and a robot or robotic arm 3108 including a tip or tool end 3110. A mail tray support 3112 is pivotally secured to mounting plate 3114 by any convenient means so as to be movable therewith and with respect thereto. Support 3112 includes a pair of pivotal side members, support members or arms 3116 and 3118 having inwardly extending flanges 3120 and 3122 thereon, respectively, which are designed to support a mail tray 326 thereon and therebetween. It should be noted that support 3112 is shown to be tilted or canted in FIGS. 7, 8 and 10-13 merely to show both the arms 3116 and 3118. Normally, the arms 3116 and 3118 are parallel to one another in the same horizontal plane as seen in FIG. 14. The arms 3116 and 3118 are pivotally movable with respect to each other by means of a pneumatic cylinder secured thereto and extending therebetween. The pneumatic cylinder is designed to enable the arms 3116 and 3118 to be moved from a closed, tray engaging position to an open, non-tray engaging position.

One or more power cylinders, either pneumatic or hydraulic, interconnect support 3112 and mounting plate 3114 to enable support 3112 to be pivotally movable with respect to mounting plate 3114.

The numeral 3128 refers to a mail sweeper assembly which is mounted on mounting plate 3114 and which is positioned therebelow. Assembly 3128 includes a plate, blade or paddle 3130 which is mounted on the end of a rotatable and longitudinally movable shaft 3132. Shaft 3132 is longitudinally movable between retracted and extended positions, and is rotatably movable between a first, non-envelope engaging position and an envelope engaging position. The shaft 3132 is rotatably and longitudinally movable by any convenient means. A second plate, blade or paddle 3134 is also rotatably mounted on mounting plate 3114 and is rotatable between a first non-envelope engaging position and a second envelope engaging position by any convenient means. As seen, paddle 3134 is spaced from paddle 3130 so that paddles 3130 and 3134 may be positioned at the opposite ends of the stack of envelopes in the stacker bin. Although the robot of this invention is ideally suited for use with the denester assembly previously described, the robot's primary purpose is to tray mail into a mail tray regardless of the manner of supplying and/or denesting empty mail trays for handling by the robot.

Referring again to FIGS. 1 through 3, the tagging device 120 can be configured to tag the trays 110 at the traying stage, or after. For example, the tagging device 120 may include a printer configured to produce a placard or tag with a unique identifier (e.g., an intelligent mail barcode (IMB)) for the filled tray 110. In other embodiments, the tray 110 can be tagged before the sleeving stage (e.g., after exiting the traying stage). In some implementations, the tagging device 120 may be located between the trayer 104 and the sleever 106 and is configured to tag each tray 110 after the tray 110 leaves the traying device 104.

Referring to FIGS. 28 through 31D, a tagging device 500 (an embodiment of tagging device 120) can include mail item scanning robot 502 and a printer 512 that produces applies an appropriate placard or tag for a tray 5110. The tagging stage may be immediately preceding the sleeving stage (e.g., as shown in FIG. 3). 5110 Trays from the one or more inserters 102 (sorters and/or presses) travel on a singular delivery line. The mail item scanning robot 502 performs a mail item scan of the tray contents by detecting tray contents and making appropriate scan—if single mail item address-up, then scan mail item; if bundled mail items address-up, then scan top mail item; if filled tray 5110 then tagging device detects nature (loose/medium/tight filled). The mail item scanning robot 502 includes a robotic arm 504 with an end-of-arm tooling 506 that comprises a wedge 508 and a scanner 510 (e.g., a barcode reader, camera, or other sensor), whereby the mail item scanning robot 502 maneuvers the end-of-arm tooling 504 to expose an address window of single mail item to scan said mail item.

In an embodiment, the robotic arm 504 plunges the end-of-arm tooling 506 into the tray 5110, causing the wedge 508 to separate mail items in the tray in order to expose an address window of at least one mail item. The scanner 510 then scans the mail item to obtain information (e.g., a mail item identifier (e.g., IMB)) that can be used (e.g., by a controller) to direct the printer 502 to produce an appropriate placard or tag for the tray 5110. FIGS. 31A through 31D show detailed views of the robotic arm 504 and end-of-arm tooling 506. The robotic arm 504 can include a base 516 and at least one extension 518 coupled by a motorized hinge 517 that actuates the extension 518 relative to the base 516. The end-of-arm tooling 506 can include a base portion 522 that is coupled to the extension 518 by another motorized hinge 520 that actuates the end-of-arm tooling 506 relative to the extension 518. In embodiments, motorized hinges 517 and 520 can have one axis of rotation or multiple axes of rotation. The wedge 508 (or multiple wedges as shown in FIGS. 31A through 31D) can include one or more angled surfaces. For example, in FIGS. 31A through 31D, wedge 508 is shown to include a first surface 524 and a second surface 526 that intersect at an angle to form wedge 508.

As shown in FIG. 30, the printer 512 includes an applicator 514 configured to extend from the printer 512 and apply the placard or tag to the tray 5110. Scanned mail item data is used by tagging device 500 to determine an appropriate tray identifier (e.g., IMB for the tray). The tagging device 500 can then apply a tray tag or placard with the identifier. Once the tray 5110 is tagged, the tray 5110 continues along a conveyor to a reject tray tag scanner to confirm correctness of the tag. The tray 5110 then continues to the sleeving station.

FIG. 3 is a zoomed-in view of the sleeving device 106 and the palletizing device 118. The sleeving device 106 may include at least one sensor (e.g., camera, photodiode array, physical mass or dimension sensor, magnetic sensor, or the like) configured to detect an incoming tray 110 and determine its size using machine-vision algorithms or other sensor algorithms for determining dimension. For example, a processor coupled to the one or more sensors can be configured to determine a shape of the tray 110 or spatial separation between portions of the tray 110. The sleeving device 106 is configured to select an appropriately sized sleeve based on the determined tray size. For example, the sleeving device 106 may be configured to retrieve a sleeve from two or more sleeve queues holding two or more sizes of sleeves, respectively. The sleeving device 106 can flip open or pop open the sleeve and then direct the tray 110 through the opened sleeve. In embodiments, the sleeving device 106 includes a mechanical (e.g., robotic arm) configured to retrieve a sleeve from a sleeve cartridge or sleeve bank and pull the sleeve into a staging area, flip or pop the sleeve open, place it on a funnel and secure it a path along which the tray 110 is pulled by the conveyance system. The sleeving device 106 can further include a plurality of paddles, mechanical arms, or the like that guide the tray 110 into the open sleeve.

Example implementations of the sleeving device 106 are also disclosed in U.S. Pat. No. 8,621,831, entitled "Robotic Mail Tray Sleever Apparatus," which is incorporated herein by reference in its entirety. Embodiments of the mail tray sleeving device 106 can include any of the embodiments described in U.S. Pat. No. 8,621,831 or any portions thereof.

FIGS. 15 through 27 illustrate example implementations of a robotic mail tray sleeving system 410 (an embodiment of mail tray sleeving device 106) for sleeving a mail tray 412. System 410 includes a conveyor system 414, a sleeve blank presentment device 416, a robotic arm 418, having end of arm tooling 420, and a tray induction system 422. Conveyor system 414 transports tray 412 to a position proximate to sleeve blank presentment system 416. Robotic arm 418 grasps a sleeve blank 424, opens the sleeve blank to form a sleeve and positions the opened sleeve proximate to induction system 422. Robotic arm 418 then releases sleeve 424 and tray 412 is positioned inside sleeve 424 before moving downstream of system 410.

Conveyor system 414 may be specialized as shown herein. Sleeve blank presentment device 416 is shown as two side-by-side rectangular holders for providing sleeves of two different sizes to system 410. An operator may restock each of the holders "on the fly" such that system 410 operates continuously during restocking. This allows for a higher average cyclic rate for the system as it operates over time. Robotic arm 418 is shown as a six axis robotic arm, but a multi axis robotic arm may also be used. The numerous degrees of freedom available in this design allow for greater tolerances during installation as any variation in actual relative position of the robotic arm 418 to conveyor system 414, sleeve blank presentment device 416, and tray induction system 422 may be corrected by altering the program controlling robotic arm 418 after installation.

Figure 16:
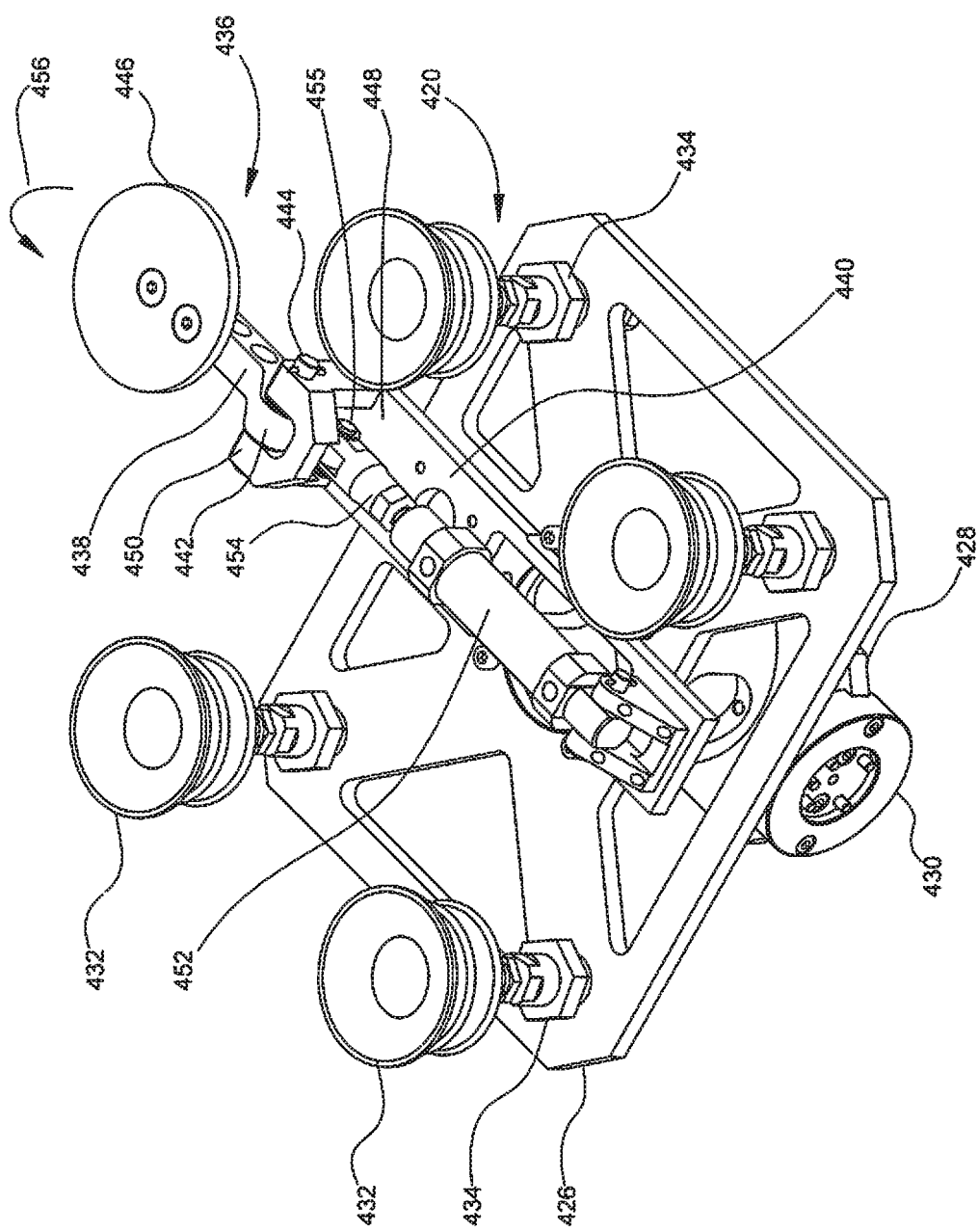
FIG. 16 is a plan perspective view of an end of arm tool of an automated mail tray sleever in accordance with an embodiment of this disclosure.
Figure 17:
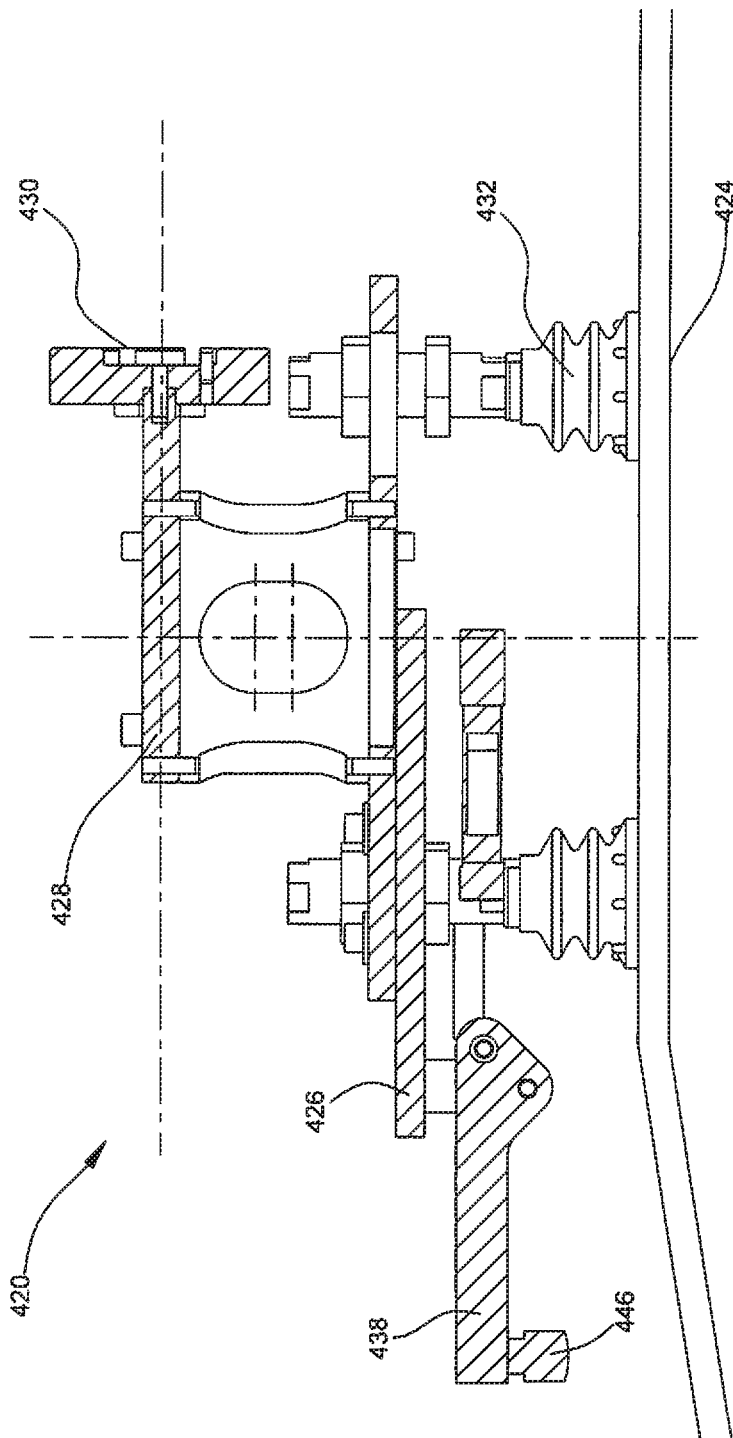
FIG. 17 is a cross-sectional view of the end of arm tool of FIG. 16 engaging a sleeve.
Figure 18:
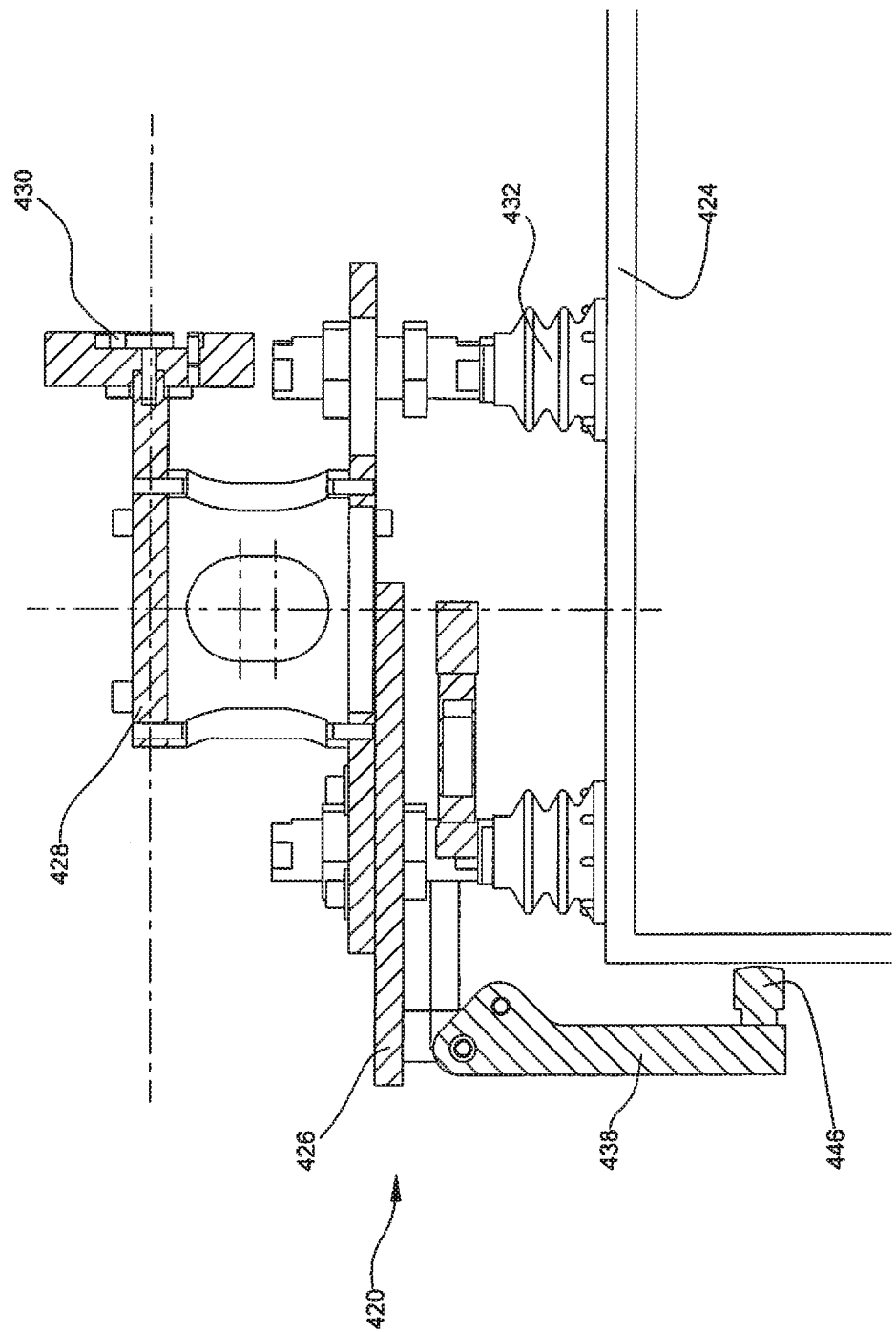
FIG. 18 is another cross-sectional view of the end of arm tool of FIG. 16 engaging a sleeve and maintaining the sleeve in an open position.

Referring to FIGS. 16-18, end of arm tooling 420 may generally include a base plate 426, a robotic arm adapter 428, a coupler 430, suction heads 432, suction head couplers 434, and sleeve opening system 436. Each of suction heads 432 are coupled to base plate 426 by suction head couplers 434. Each suction head may be in fluid communication with its own air supply for creating a partial vacuum. Alternatively, all four suction heads may be in fluid communication with the same air supply. End of arm tooling 420 may be coupled to robotic arm 418 (shown in FIG. 15) at coupler 430.

Sleeve opening system 436 may be coupled to base plate 426 by any of a variety of means including welding or fastening. Sleeve opening system 436 includes an arm 438 and a base 440. Arm 438 includes a first end comprising a cam portion 442 having an aperture 444 that comprises the pivot point of cam portion 442. Aperture 444 is positioned to be a working portion of cam portion 442 that may be engaged to move a second end of arm having a contact 446 at a point distal to cam portion 442. Base portion 440 may comprise a plate portion 448 and an extension 450 through which aperture 444 also passes. Arm 438 may be pivotally coupled to extension 450 by a pin, rivet, or other fastening means. Actuator 452 urges a rod 454 that is engaged to arm 438 at aperture 455 such that substantially linear motion of rod 454 translates to an arcuate motion of contact 446 about aperture 444 and along path 456. Thus, when actuator 452 urges rod 454 contact 446 is pivoted in a plane perpendicular to the plane defined by base plate 426. Actuator 452 and rod 454 may comprise pneumatic piston, a screw drive, or any other known means of translating substantially linear motion into arcuate motion. Alternatively, other drive systems could be used including belts, chains and other devices.

Figure 19:
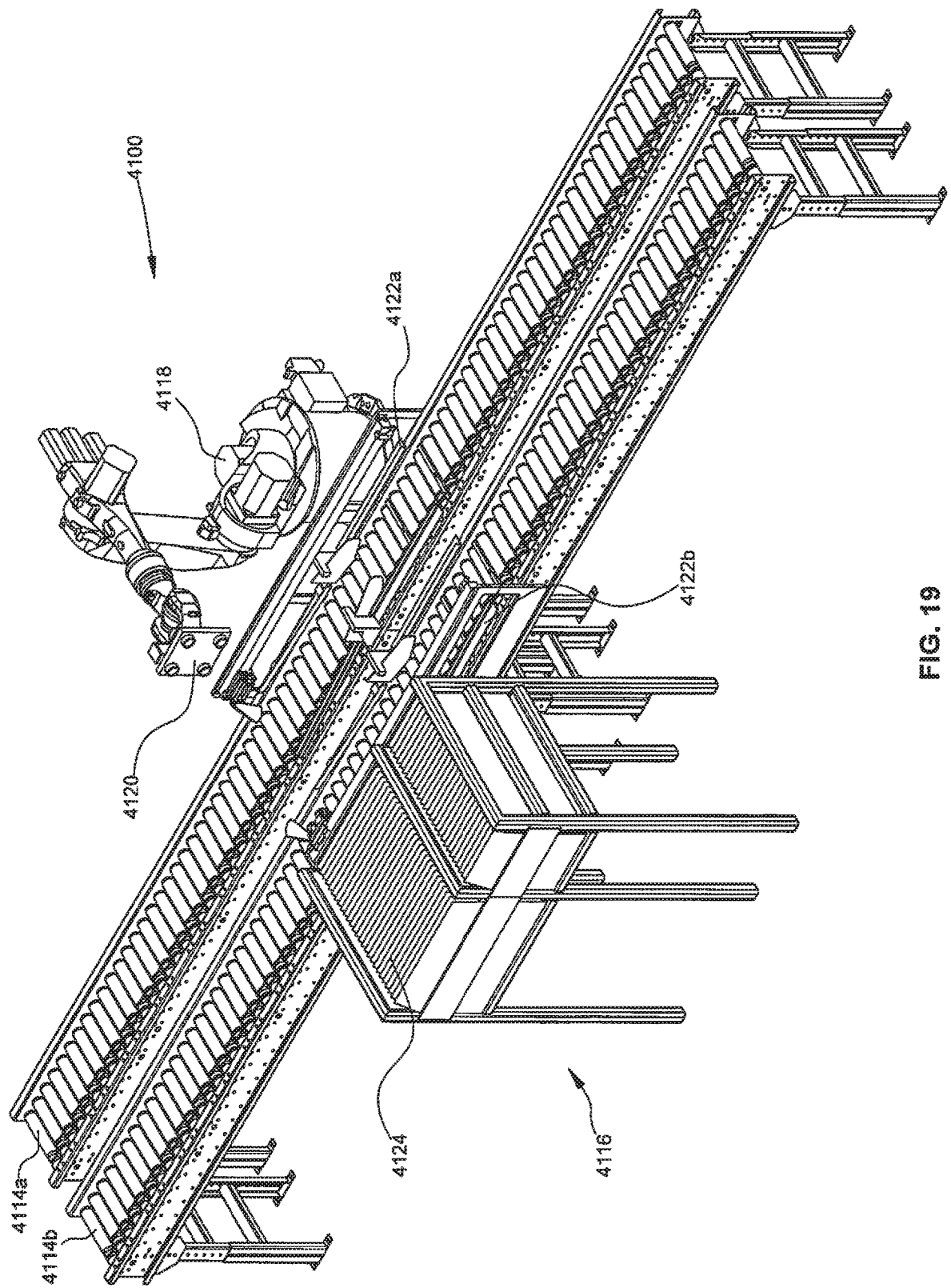
FIG. 19 is a perspective view of an automated mail tray sleever in accordance with an embodiment of this disclosure.
Figure 20:
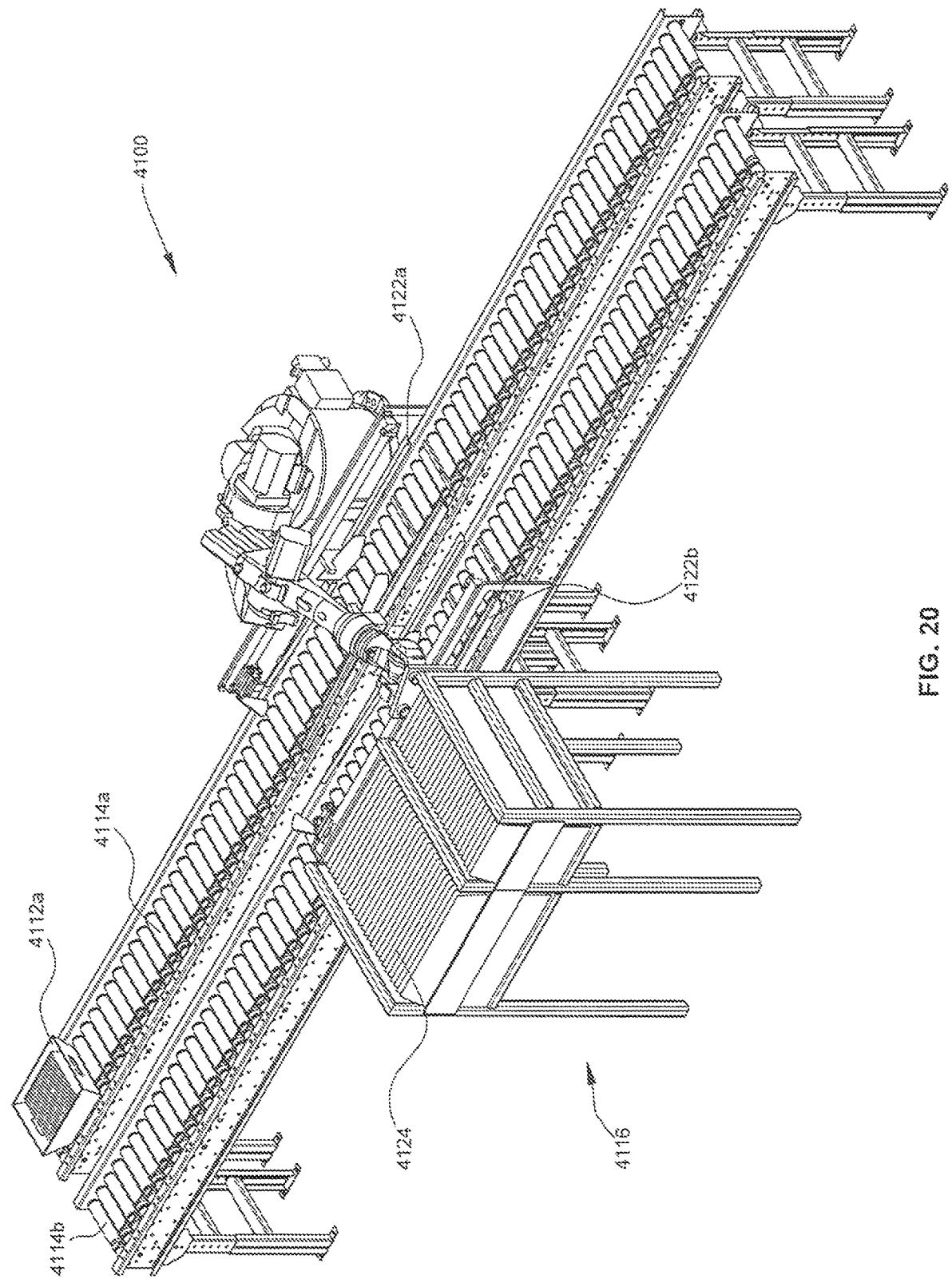
FIG. 20 is another perspective view of an automated mail tray sleever in accordance with an embodiment of this disclosure.
Figure 21:
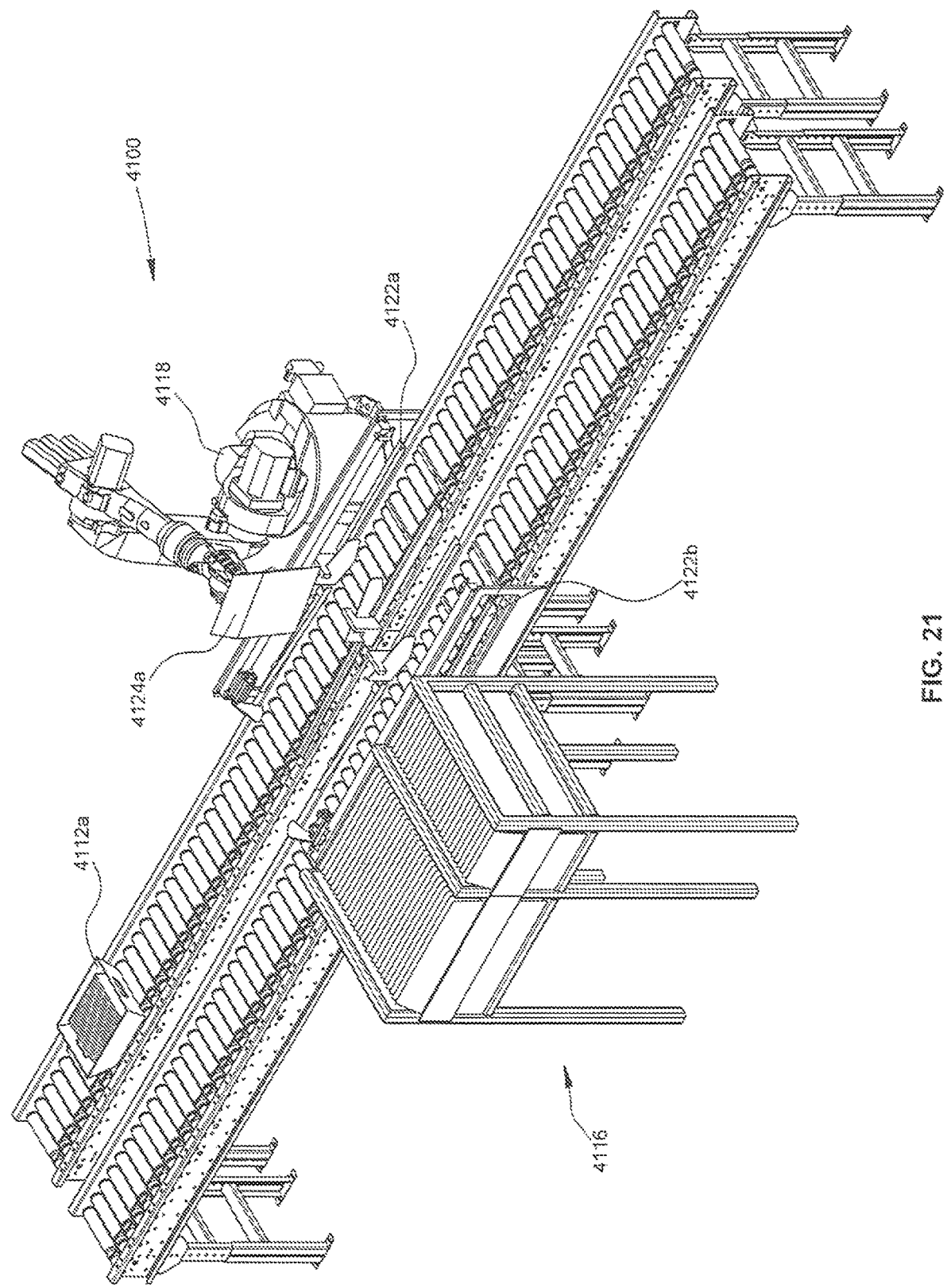
FIG. 21 is another perspective view of an automated mail tray sleever in accordance with an embodiment of this disclosure.
Figure 22:
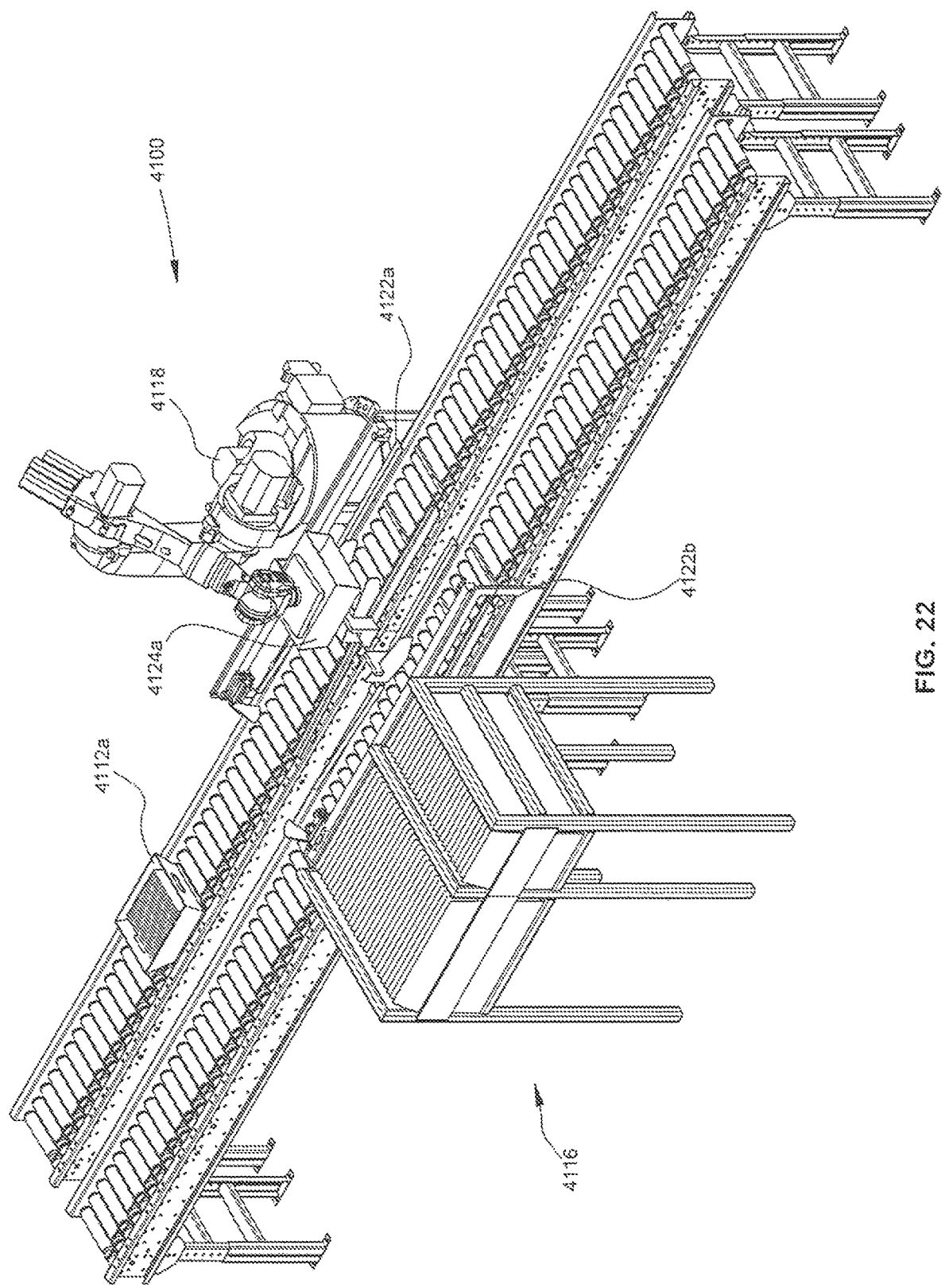
FIG. 22 is another perspective view of an automated mail tray sleever in accordance with an embodiment of this disclosure.
Figure 23:
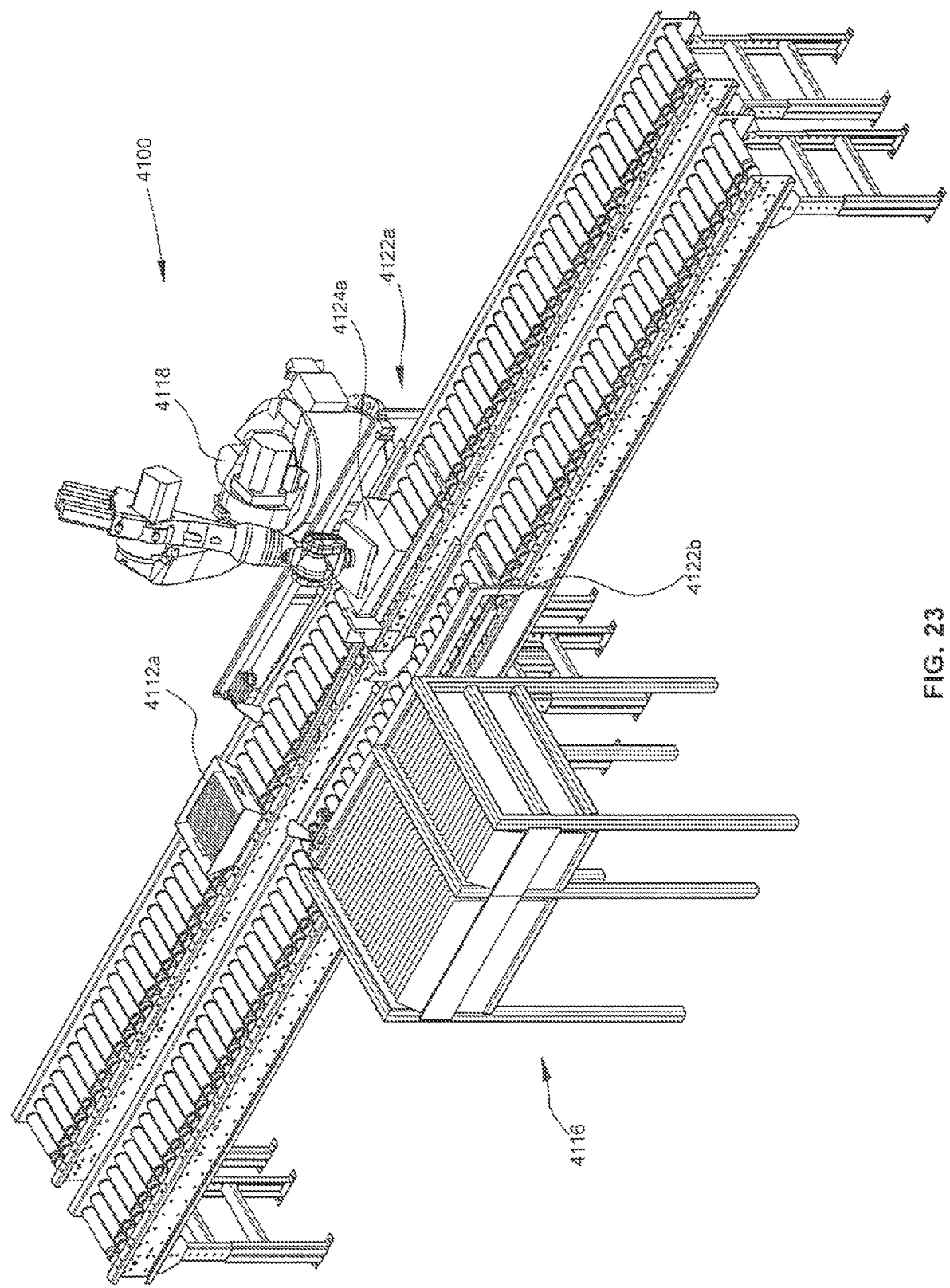
FIG. 23 is another perspective view of an automated mail tray sleever in accordance with an embodiment of this disclosure.
Figure 24:
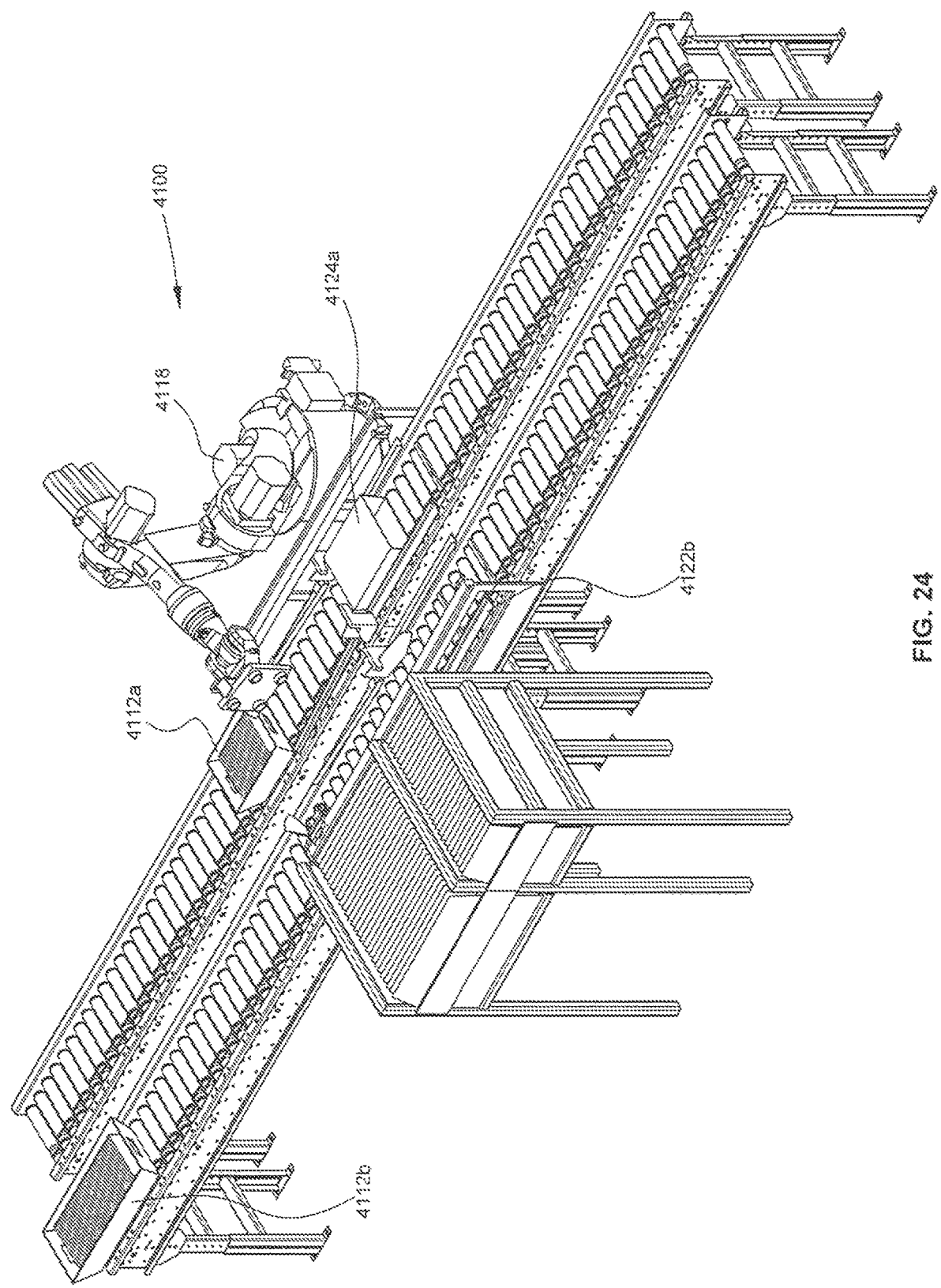
FIG. 24 is another perspective view of an automated mail tray sleever in accordance with an embodiment of this disclosure.
Figure 25:
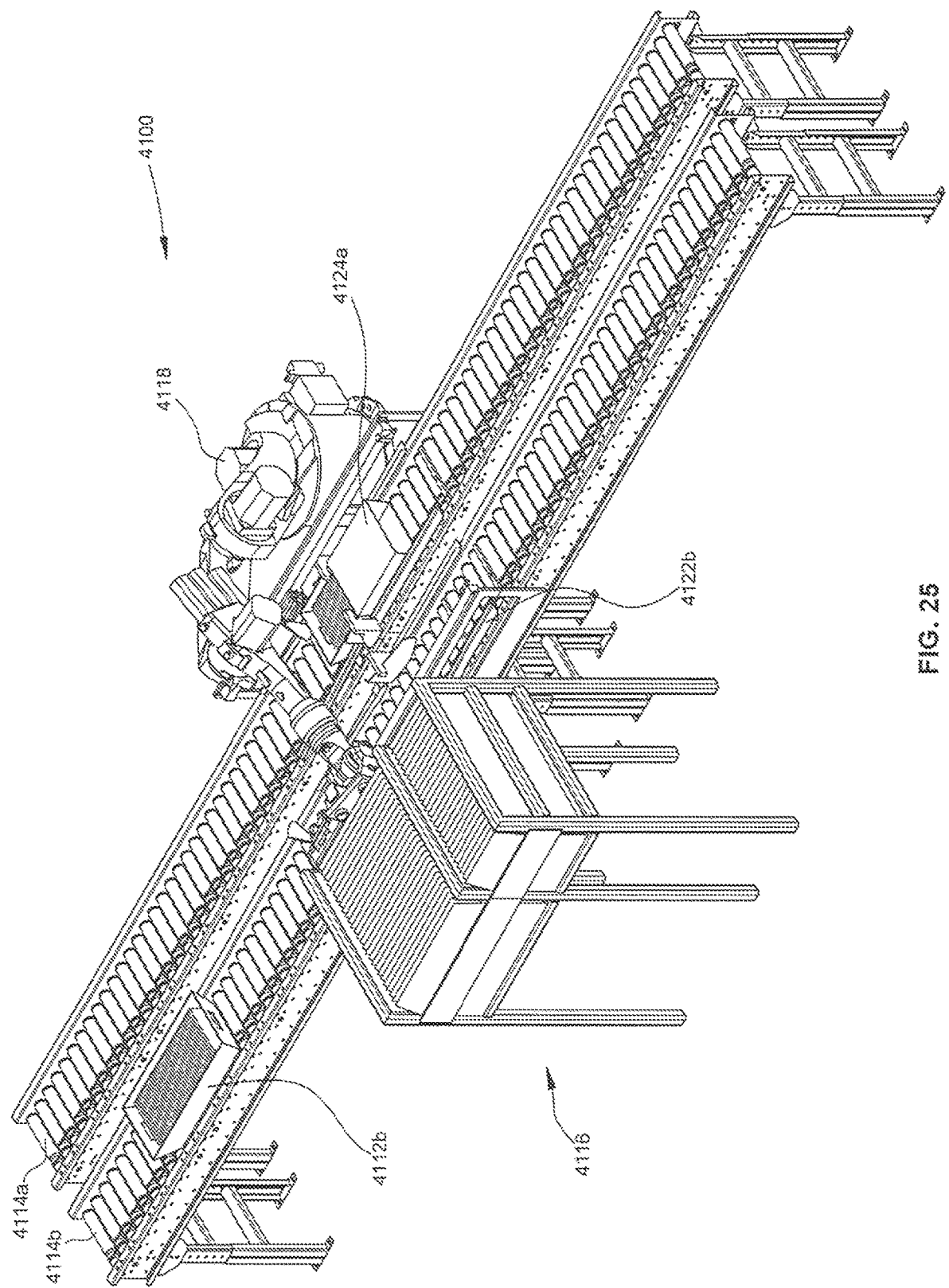
FIG. 25 is another perspective view of an automated mail tray sleever in accordance with an embodiment of this disclosure.
Figure 26:
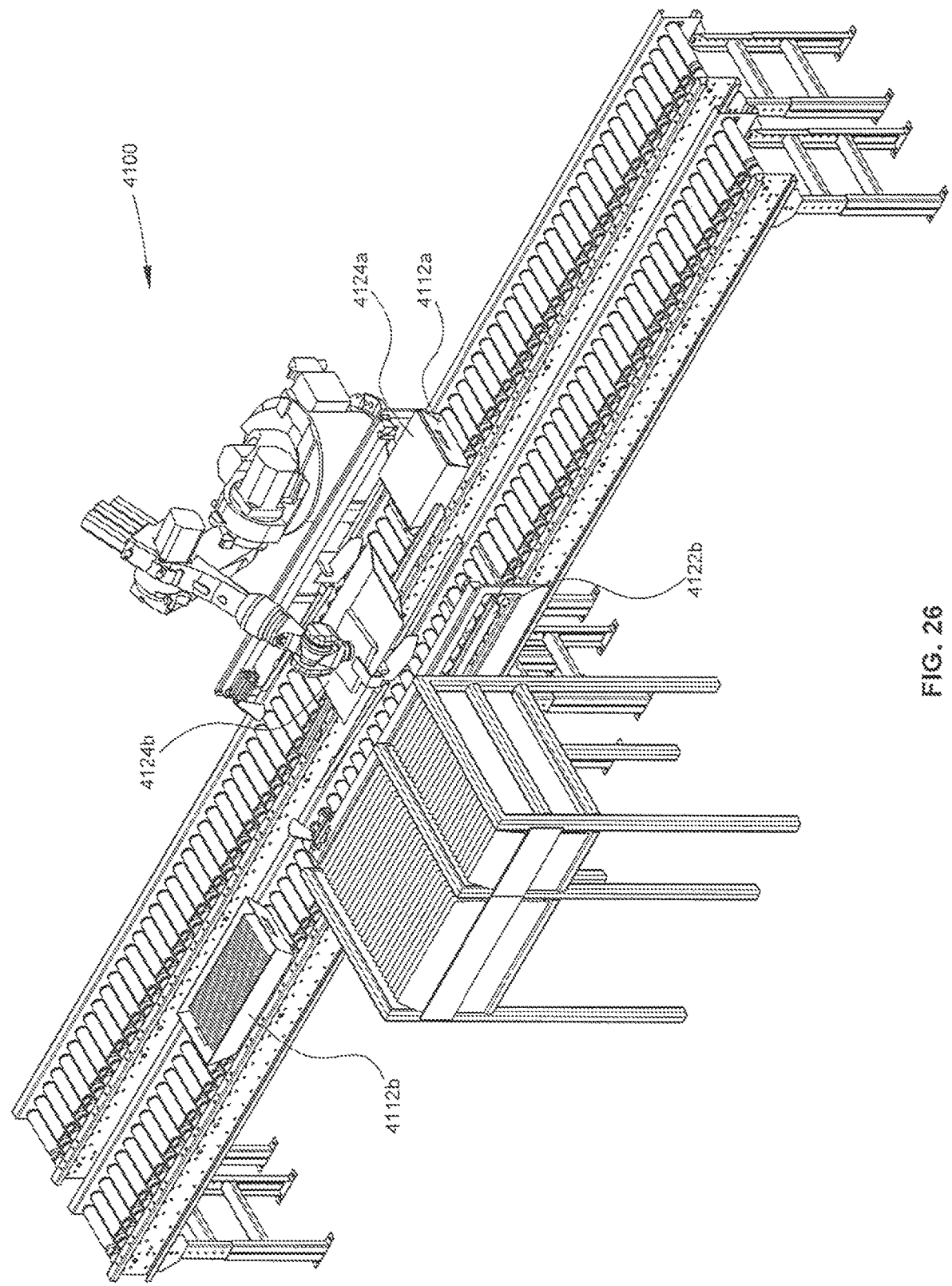
FIG. 26 is another perspective view of an automated mail tray sleever in accordance with an embodiment of this disclosure.
Figure 27:
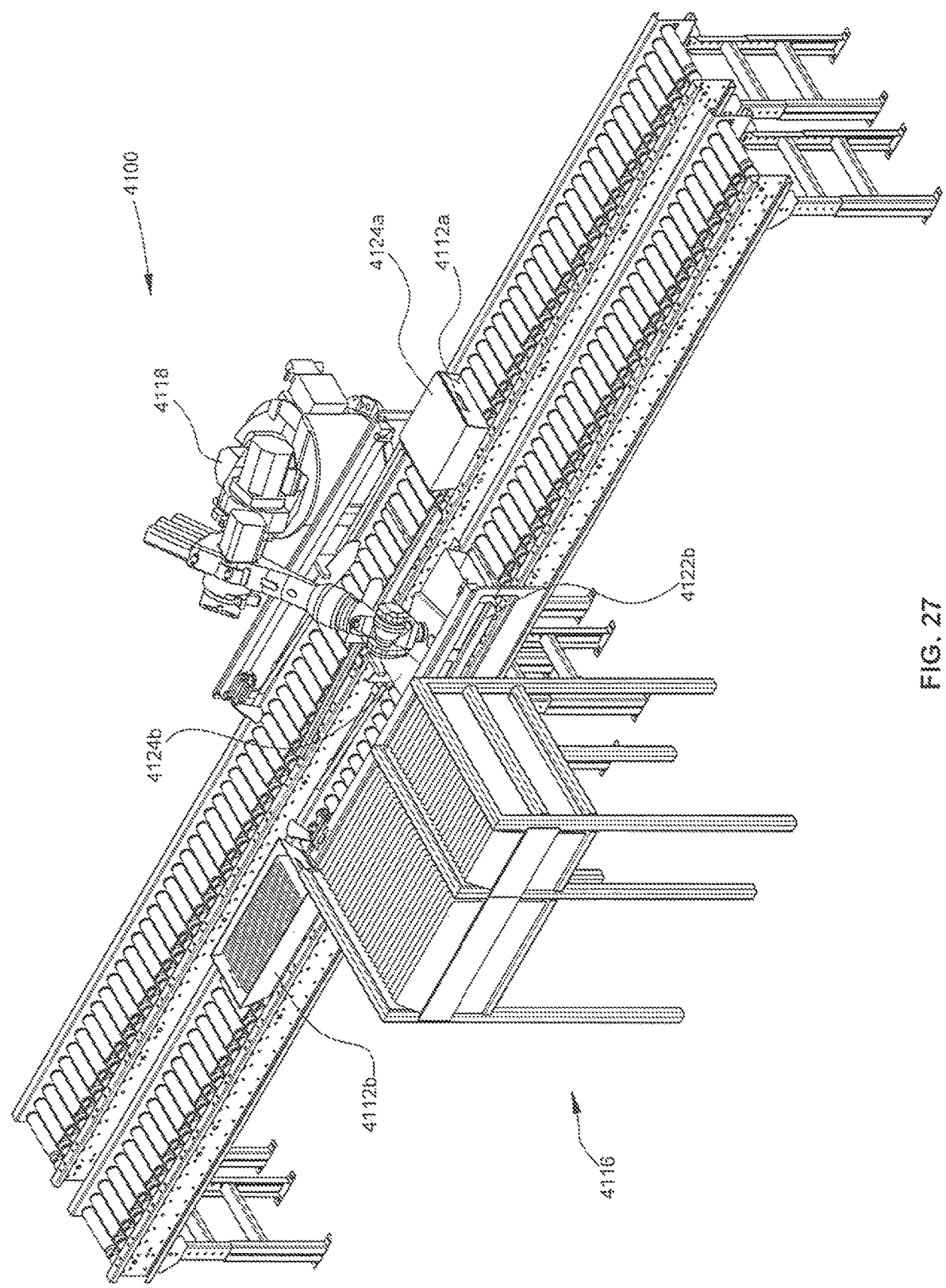
FIG. 27 is another perspective view of an automated mail tray sleever in accordance with an embodiment of this disclosure.
Figure 28:
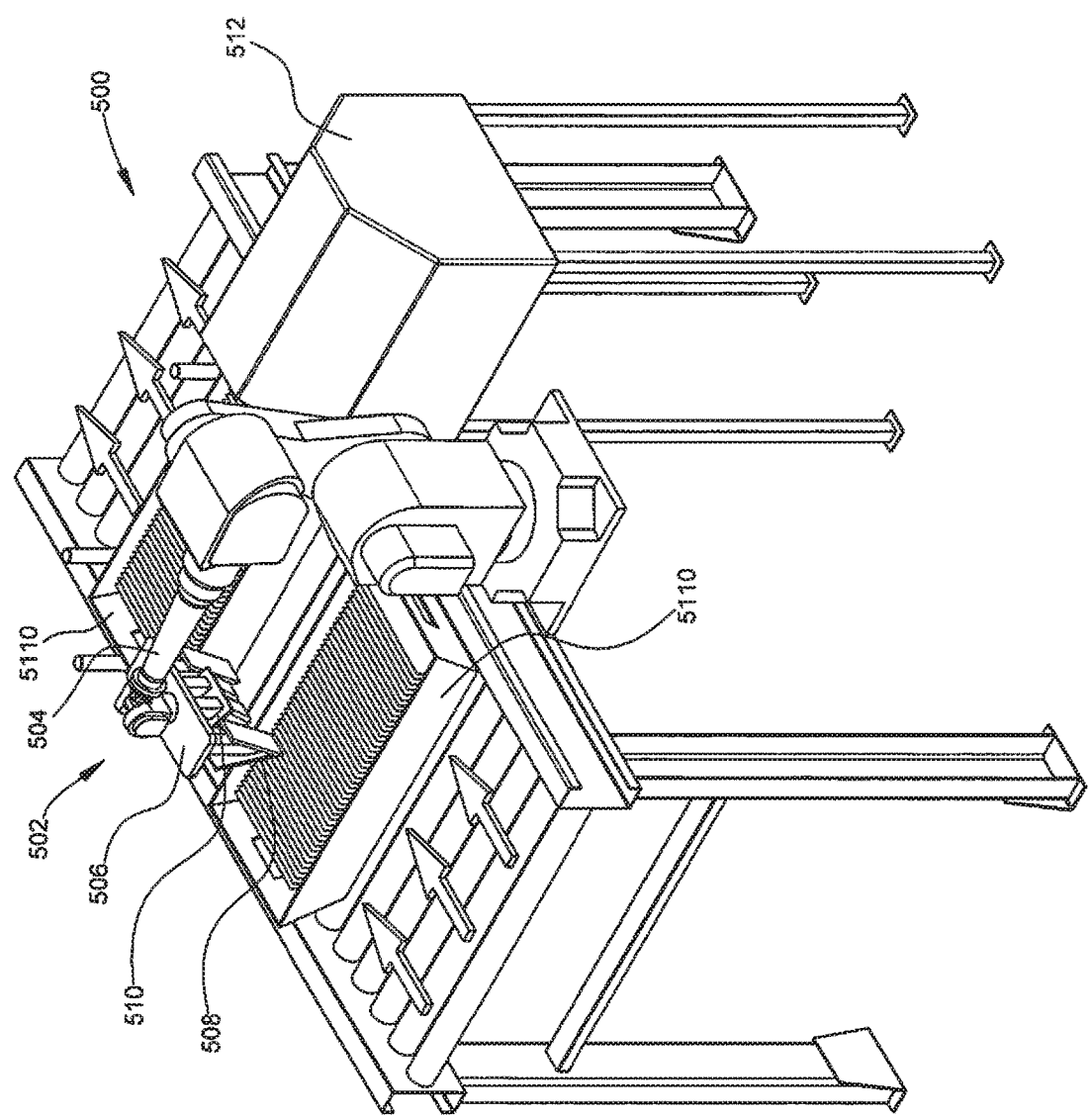
FIG. 28 is a perspective view of an automated mail tray tagger in accordance with an embodiment of this disclosure.
Figure 29:
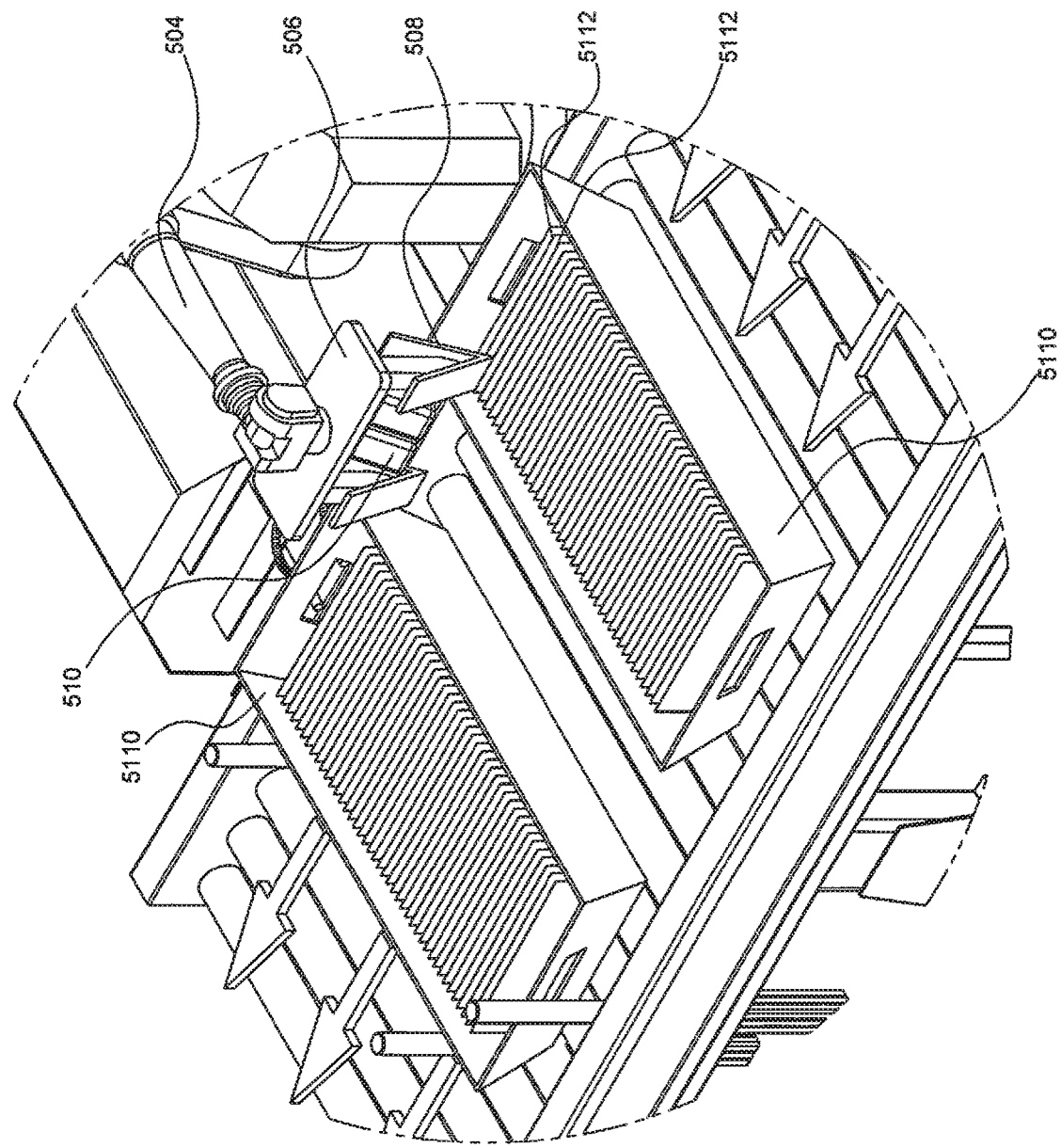
FIG. 29 is a partial perspective view of an automated mail tray tagger in accordance with an embodiment of this disclosure.
Figure 31A:
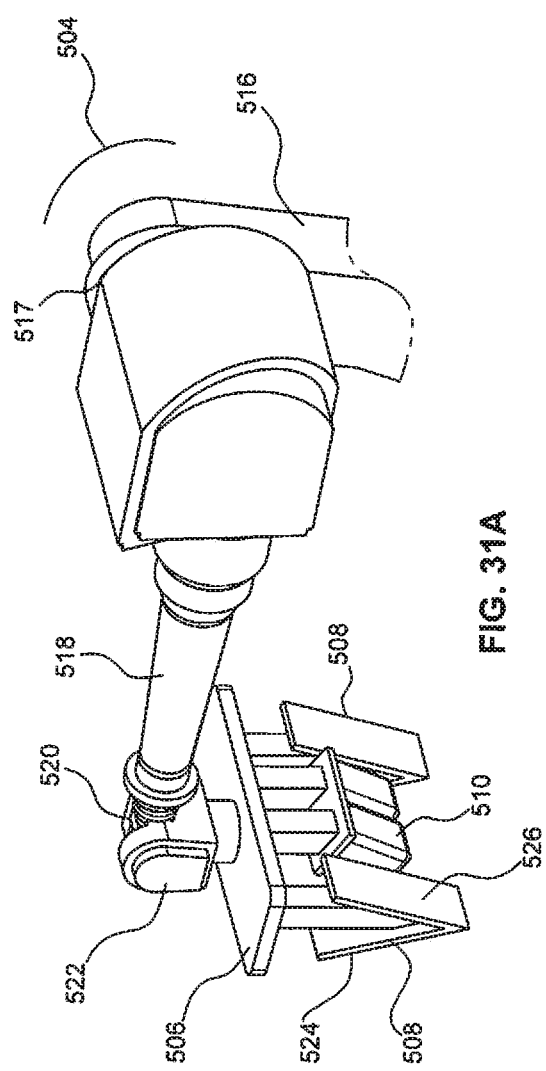
FIG. 31A is a partial perspective view of an automated mail tray tagger in accordance with an embodiment of this disclosure.
Figure 31B:
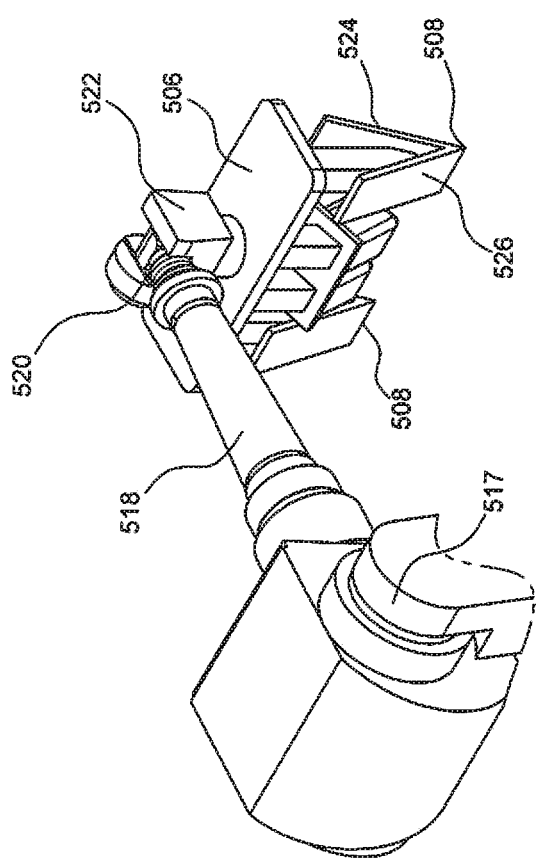
FIG. 31B is a partial perspective view of an automated mail tray tagger in accordance with an embodiment of this disclosure.

Referring to FIGS. 19-27, a method of sleeving mail trays is illustrated using an embodiment of the robotic sleeving system disclosed herein. As shown in FIG. 19, system 4100 begins a sleeving cycle with robotic arm 4118 in a generic "home" position. In FIG. 20, robotic arm 4118 engages a sleeve 4124a in device 4116 by means of the end of arm tooling 4120. As shown in FIG. 21, robotic arm 4118 moves sleeve 4124a to a first conveyor line 4114a on which a first tray 4112a is travelling. In FIG. 22, the end of arm tooling is used to open sleeve 4124a by exerting a force on a side surface of sleeve 4124a in a way that biases sleeve 4124a into an open position. In general, this operation may be carried out in a configuration such that gravity is also biasing sleeve 4124a into the open position. In FIG. 23, sleeve 4124a is placed onto tray induction system 4122a as tray 4112a advances. As shown in FIG. 24, after placing sleeve 4124a on tray induction system 4122a, end of arm tooling releases sleeve 4124a and moves to repeat the process. In FIG. 25, robotic arm 4118 uses end of arm tooling 4120 to engage a second sleeve 4124b and position sleeve 4124b proximate to a second conveyor line 4114b. As shown in FIG. 26, the end of arm tooling 4120 opens sleeve 4124b similarly to how sleeve 4124a was opened. In FIG. 27, sleeve 4124b is placed on tray induction system 4122b as tray 4112a, now within sleeve 4124a, advances past system 4110.

In general, a method consistent with some embodiments would include the following steps: (a) providing a conventional mail tray containing mail envelopes being transported on the conveyor; (b) positioning a source of empty sleeves (e.g., device 416) in a position proximate to the conveyor; (c) providing a robot including a multi-axis robot arm (e.g., arm 418) having a sleeve support and sleeve former (e.g., end of arm tooling 420) secured to an end thereof; (d) positioning the robot relative to the conveyor and the source of sleeves so that the robot sleeve support and sleeve former may be moved therebetween; (e) providing a tray entering a conveyor (e.g., conveyor 414) in a staging zone upstream of the robot, where sensors determine the tray type and/or size for the robot as the tray moves down the conveyor; (f) causing the robot arm to move to the source of empty sleeves, pick the correct sleeve type/size using suction from the end of arm tooling, and to then position an empty sleeve in the end of arm tooling; (g) forming the empty sleeve into the sleeve's ready (open) position while in motion toward the tray induction system (e.g., system 422); (h) moving the robot arm while positively retaining the formed sleeve during motion so that the empty sleeve in the end of arm tooling is positioned at the tray induction system in the sleeve's open position; (i) moving the end of arm tooling and the formed sleeve so as to place the formed sleeve onto the funnel device of the tray induction station; (j) securing the opened sleeve in the tray induction station by means of the funnel device and movable stops as described herein; (k)

releasing the opened sleeve to the tray induction station from the robot by ending the end of arm tooling suction; (l) sending the robot back to the source of sleeves so that the robot end of arm tooling may pick the correct sleeve type/size for the next tray entering a conveyor (e.g., conveyor 4114*b*) at a point upstream of the robot where sensors determined the next tray type and/or size for the robot as the next tray moves down the conveyor; (m) concurrently, while the robot is picking the next sleeve for the next tray, inducting the previous tray into the sleeve via a paddle device that pushes the tray into the opened sleeve along guided side rails contained within the tray induction station; (n) discharging the sleeved tray from the tray induction station onto the conveyor; (o) concurrently moving the robot arm and empty sleeve support from the source of empty trays for the next sleeve to the next tray induction station; and (p) similarly repeating the cycle for additional tray/sleeve sizes and/or types detected as the trays are transported down the conveyor.

Referring again to FIGS. 1 through 3, in some embodiments, the system 100 further includes a strapper 116 configured to secure the sleeved tray 110 with straps prior to its transport to the palletizing station. The palletizing device 108 may include a sensor or scanner (e.g., barcode reader) configured to detect the unique identifier (e.g., IMB) on the placard or tag of each tray 110. For example, the sensor or scanner can be a user handled sensor or scanner, or in other embodiments, the sensor or scanner can be coupled to an end-of-arm tooling of the palletizing device 108. A controller (e.g., computing system including a processor or microcontroller) may be configured to assign the tray 110 a pallet position based on the tray/pallet identifier. The palletizing device 108 includes a mechanical (e.g., robotic) arm that places each tray in a determined position within a pallet 112. When the pallet 112 is complete an indicator light, graphical user interface, and/or speaker/alarm can provide a visual and/or audible alert for an operator to remove the filled pallet 112 and place an empty pallet 112 into the vacated position. In some implementations, this process can also be automated, for example, using pallet conveyor, self-driving (e.g., computer controlled) or remotely controlled forklifts. In some embodiments, the palletizer includes a printing/tagging device configured to generate and/or apply a tag or placard with an identifier (e.g., IMB) for each pallet 112. In other embodiments, the pallet 112 can be tagged after leaving the palletizer 108, for example, a pallet placard may be printed and placed on the pallet 112 by the operator prior to its removal from the palletizing station.

At the palletizing (or traying, or sleeving, or tagging) station, tray (and/or mail item and/or pallet) information may be read and sent to a database storing information regarding the mail item, tray, and pallet identifiers (e.g., respective IMBs). The database may include detailed information, such as origination, destination, and/or mail item information (e.g., priority info, details regarding contents (e.g., value, confidential status), etc.). For example, scan data can be sent to a database; this data is then pushed into a text (e.g. ".xml") file; which is then married to an "exceptions" file (e.g., another text (e.g., ".txt") file); the Exceptions (.txt) and Scan Data (.xml) are reconciled so that final (mail.dat) can be delivered to USPS. This bridges the physical-digital gap between what actually occurs in the real world (to the physical mail items, trays, pallets, etc.) and the summary text file (e.g., a "mail.dat") file that includes a subset of the information (e.g., IMBs corresponding to each pallet, trays, and/or mail items contained therein). FIG. 5 shows an example mail.dat file with mail item, tray, and pallet identification info (e.g., mail item, tray, and pallet IMBs). In some implementations, a respective controller 118 (and/or a shared central controller) is in communication with the trayer 104 and palletizer 108, and possibly the sleever 106 and/or any standalone tagging devices and so forth. The controller 118 may be coupled to sensors (e.g., barcode scanners) configured to detect identifier information from mail item, tray, and/or pallet tags or placards before, after, or during any of the operational stages described above (e.g., during or after the traying stage and/or the palletizing stage) The controller 118 may be implemented as a computing system or network of computing systems that monitor and/or control the tagging, traying, sleeving, and/or palletizing operations described herein. In some implementations, where one or more of the tagging, traying, sleeving, and/or palletizing operations are completed manually, the controller 118 may be communicatively coupled with handheld scanners or configured to receive information downloaded from handheld scanners that can detect identifier information at, after, or before any of the operational stages described herein. Identifier information for actual physical mail is then used to ensure it matches the digital file being submitted to USPS for postage discounts of same mail. Additionally, identifier information for actual physical mail processed can provide audit traceability of the actual mail production to ensure mailer can demonstrate documentation of USPS compliance.

Figure 4:
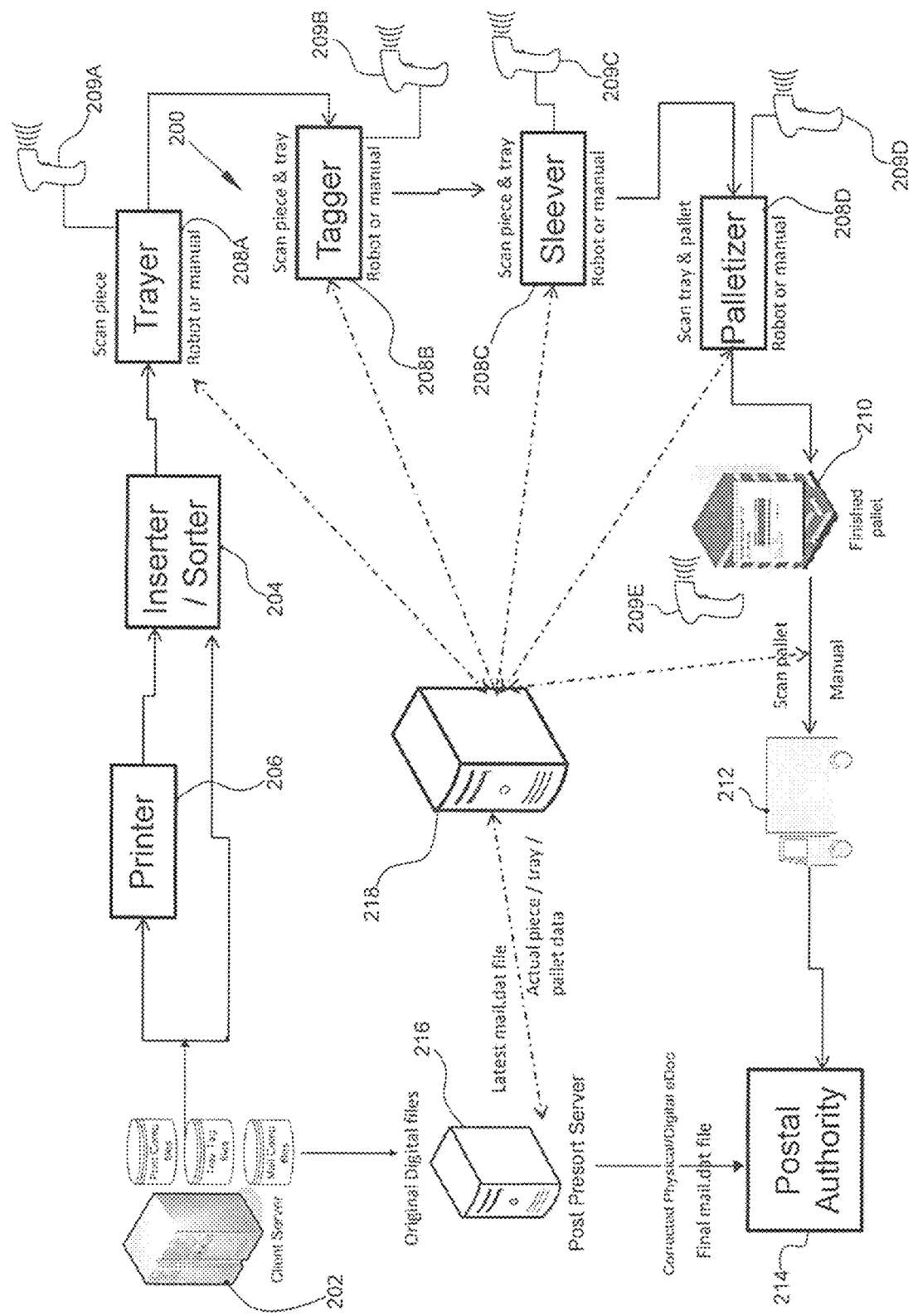
FIG. 4 is a block diagram illustrating a mail monitoring system and a corresponding operational flow in accordance with an embodiment of this disclosure.

FIG. 4 is a block diagram illustrating a mail monitoring system 200 and a corresponding operational flow in accordance with an embodiment of this disclosure. The monitoring system 200 can include a client server 202 (e.g., controller 118 or a client server coupled to controller 118) that is configured to store detailed information regarding mail items, corresponding identifier information, and a mail summary (e.g., mail.dat) file. The client server 202 may be configured to control a printer 206 to print content and/or a label for each mail item. Once labeled and/or sorted, the mail items can be processed through various stages.

The mail items can be presented to the trayer 208A (e.g., trayer 104) by an inserter or press 204 (e.g., inserter 102). The mail items (or a subset of the mail items) are scanned (e.g., by scanner 209A) and placed into a mail tray 110 by the trayer 208A, or can be manually transferred in some embodiments of system 200. In some embodiments, the scanner 209A can be coupled to the trayer 208A or integrated within the trayer structure (e.g., as part of an end-of-arm tooling or the like). In other embodiments, the scanner 209A can include a user-driven (e.g., handheld) scanner. The mail item scan data from scanner 209A is sent to controller 218 (e.g., controller 118 or another controller/server coupled to controller 118).

The mail tray can be transported (e.g., carried or conveyed) to a tagging station. At least one mail item in the mail tray 110 is scanned (e.g., by scanner 209B) and the appropriate mail tray tag is applied to the mail tray 110 by tagger 208B (e.g., tagger 120), or manually. The applied mail tray tag may be re-scanned (e.g., by scanner 209B or another scanner). In some embodiments, the scanner 209B can be coupled to the tagger 208B or integrated within the tagger structure (e.g., as part of an end-of-arm tooling or the like). In other embodiments, the scanner 209B can include a user-driven (e.g., handheld) scanner. The mail item and mail tray scan data from scanner 209B is sent to controller 218.

The tagged mail tray 110 can be transported (e.g., carried or conveyed) to a sleeving station. The mail tray 110 is sleeved by sleever 208C (e.g., sleever 106), or manually. Prior to sleeving the mail tray 110, at least one mail item in the mail tray may be scanned (e.g., by scanner 209C). The corresponding mail tray tag can also be scanned (e.g., by scanner 209C or another scanner). In some embodiments, the scanner 209C can be coupled to the sleever 208C or integrated within the sleever structure (e.g., as part of an end-of-arm tooling or the like). In other embodiments, the scanner 209C can include a user-driven (e.g., handheld) scanner. The mail item and mail tray scan data from scanner 209C is sent to controller 218.

The sleeved mail tray 110 can be transported (e.g., carried or conveyed) to a palletizing station. The sleeved mail tray 110 is loaded onto a pallet 112 by palletized 108, or manually. Before, after, or in conjunction with loading the sleeved tray 110 onto the pallet, the tray 110 is scanned (e.g., by scanner 209D). The tray 110 may be loaded into an appropriate pallet position (e.g., by the palletizer or manually) based on a tray identifier scanned by scanner 209D. In some embodiments, the scanner 209D can be coupled to the palletizer 208D or integrated within the palletizer structure (e.g., as part of an end-of-arm tooling or the like). In other embodiments, the scanner 209D can include a user-driven (e.g., handheld) scanner. A standalone tagging device or a tagging device coupled to or incorporated within the palletizer structure (e.g., as part of an end-of-arm tooling or the like) is configured to apply a tag to the pallet with an appropriate pallet identifier, which may be based on the scanned mail tray identifier. The scanner 209D (or another scanner) is configured to scan the pallet identifier. The mail tray and mail pallet scan data from scanner 209D is sent to controller 218.

The scanned identifier information may be stored by a monitoring/auditing computer (e.g., controller 218). This information can be compared with stored routing tables and/or USPS customer supplier agreement (CSA) tables. When a pallet 112 is completed and tagged with an identifier tag or placard, the mail tray and mail pallet scan data from scanner 209D is sent to controller 218. The pallet information is also stored by the monitoring/auditing computer (e.g., controller 218). Finished pallets 210 (e.g., pallet 112) are transported to a drop off location. Prior to or in conjunction with transferring a finished pallet 210 onto a vehicle 212 for transport, the pallet identifier can be scanned again (e.g., by scanner 209E). For example, scanner 209E can include a user-driven (e.g., handheld) scanner. The pallet scan data from scanner 209E can be sent to controller 218.

The finished pallets 210 can be transported (e.g., by vehicle 212) to a postal authority 214 (e.g., USPS) that takes control of the finished pallets 210 to perform at least a portion of the delivery process. The client server 202 can be configured to provide original mail item information (e.g., the mail.dat file) to a post presort server 216. In an embodiment, the monitoring/auditing computer (e.g., controller 218) is configured to provide actual mail item, tray, and/or pallet information (e.g., scanned IMBs or another mail.dat file generated from the scanned IMBs) to the post presort server 216. In another embodiment, the monitoring/auditing computer (e.g., controller 218) can be configured to determine the difference (e.g., a delta) between actual mail item, mail tray, and/or pallet information and is further configured to provide post presort server 216 with said information so that the final mail item information (e.g. the final mail.dat file) can be completed. This then ensures physical elements match the digital elements and allows for streamlined audit traceability of each pallet, (and/or mail item and/or tray) before it is further transported by the postal authority 214.

Accordingly, errors that can result in hefty penalties will be avoided and users are able to earn discounts currently being missed due to human error.

Per the Mailer ScoreCard mailers will now be graded on each of multiple performance metrics (FIGS. 6A and 6B) with fines assessed for failure to meet minimum USPS established thresholds. FIGS. 6A and 6B show a spreadsheet that shows an example of USPS mailer scorecard metrics that can be impacted by the mail monitoring system in manual and automated (or semi-automated) mail handling system implementations. Quantity and type of USPS mailer scorecard metrics is subject to change and the mail monitoring system can be adapted to address any such changes accordingly. Validation Type is Pallet-Label (P-L), Pallet Content (P-C), Tray Label (T-L), and/or Tray Content (T-C). The "XX" (double-X means) notation indicates that the referenced manual or automated mail handling station is an opportunity to do a "double check" (i.e., T-L & T-C check) at the same location. Far right columns provide quantifications of the present relative value and risk level for each USPS Mailer Scorecard metric allowing mailers to prioritize implementation segments of mail handling system.

Access and control to the monitoring system may be selected from a variety of preset permissions, configurations, and/or custom selections. In some implementations, all monitoring/auditing is performed on-site (e.g., via controller 118 or network of controllers 118). For example, the system may be configured for self-monitoring. In other implementations, the monitoring/auditing operations may be delegated to a vendor or third party auditor with oversight of the on-site control systems (e.g., a vendor having established communication with the one or more controllers 118). Additionally, the monitoring/auditing operations can be shared among the mailer (i.e., the mail owner) and its vendor (i.e., mail service provider) in team monitoring arrangements. For example, the vendor may have access to full details collected by the monitoring system, while the mailer may be able to access summarized information to oversee the mailing operations. In some implementations, a third party auditor can also share access with the mailer and the vendor. Different permission levels or access can be limited to one or two of these parties, or provided to all of these parties and/or other parties involved in overseeing the system operations.

It should be recognized that the various functions, control operations, processing blocks, or steps described throughout the present disclosure may be carried out by any combination of hardware, software, or firmware. In some embodiments, various steps or functions are carried out by one or more of the following: electronic circuitry, logic gates, multiplexers, a programmable logic device, an application-specific integrated circuit (ASIC), a controller/microcontroller, or a computing system. A computing system may include, but is not limited to, a personal computing system, a mobile computing device, mainframe computing system, workstation, image computer, parallel processor, or any other device known in the art. In general, a "computing system" or "controller" is broadly defined to encompass any device having one or more processors, which execute instructions from a carrier medium.

Program instructions implementing functions, control operations, processing blocks, or steps, such as those manifested by embodiments described herein, may be transmitted over or stored on carrier medium. The carrier medium may be a transmission medium, such as, but not limited to, a wire, cable, or wireless transmission link. The carrier medium may also include a non-transitory signal bearing medium or storage medium such as, but not limited to, a read-only memory, a random access memory, a magnetic or optical disk, a solid-state or flash memory device, or a magnetic tape. In embodiments, the carrier medium can also include a cloud or network based storage solution.

Furthermore, it is to be understood that the invention is defined by the appended claims. Although embodiments of this invention have been illustrated, it is apparent that various modifications may be made by those skilled in the art without departing from the scope and spirit of the disclosure.

What is claimed is:

1. A mail handling system, comprising:
   a traying device configured to transfer mail items into a tray;
   a mail tray tagging device configured to apply a tag to the tray, the mail tray tagging device including: a robotic arm; an end-of-arm tool disposed at a movable end of the robotic arm, the end-of-arm tooling further including a scanner, the scanner configured to scan a mail item identifier for at least one mail item of the mail items in the tray; and a printer configured to apply the tag to the tray, the tag including a tray identifier based upon the mail item identifier scanned by the scanner;
   a sleeving device configured to place a sleeve over the tray; and
   a palletizer configured to transfer the sleeved tray into a pallet.

2. The mail handling system of claim 1, wherein mail tray tagging device is configured to tag the tray with a tray identifier.

3. The mail handling system of claim 2, further comprising a pallet tagging device configured to tag the pallet with a pallet identifier.

4. The mail handling system of claim 3, further comprising one or more computing systems configured to store a mail item identifier, the tray identifier, and the pallet identifier, and further configured to send information regarding the mail item identifier, the tray identifier, and the pallet identifier to a remote server for purposes of ensuring the actual physical mail matches the digital files submitted to USPS for postage discounts of same mail.

5. The mail handling system of claim 4, further comprising one or more scanners configured to scan one or more of: the mail item identifier, the tray identifier, and the pallet identifier at one or more operational locations.

6. The mail handling system of claim 5, wherein the one or more computing systems are configured to store information received from the one or more scanners regarding the one or more of: the mail item identifier, the tray identifier, and the pallet identifier, and further configured to send the information received from the one or more scanners to the remote server for purposes of ensuring the actual physical mail matches the digital files submitted to USPS for postage discounts of same mail.

7. A method, comprising:
   transferring mail items into a tray;
   tagging the tray with a tray identifier by employing a mail tray tagging device that includes a robotic arm, a printer, and an end-of-arm tool disposed at a movable end of the robotic arm, the end-of-arm tooling further including a scanner, where the scanner scans a mail item identifier for at least one mail item of the mail items in the tray, and the printer applies the tag to the tray, the tag including a tray identifier based upon the mail item identifier scanned by the scanner;
   placing a sleeve over the tray;
   transferring the sleeved tray into a pallet; and
   tagging the pallet with a pallet identifier.

8. The method of claim 7, further comprising:
   storing a mail item identifier, the tray identifier, and the pallet identifier; and
   sending information regarding the mail item identifier, the tray identifier, and the pallet identifier to a remote server for purposes of ensuring the actual physical mail matches the digital files submitted to USPS for postage discounts of same mail.

9. The method of claim 8, further comprising:
   scanning, with one or more scanners, one or more of: the mail item identifier, the tray identifier, and the pallet identifier.

10. The method of claim 9, wherein scanning, with one or more scanners, one or more of: the mail item identifier, the tray identifier, and the pallet identifier includes:
    scanning the mail item identifier prior to or in conjunction with tagging the tray with the tray identifier.

11. The method of claim 9, wherein scanning, with one or more scanners, one or more of: the mail item identifier, the tray identifier, and the pallet identifier includes:
    scanning the tray identifier prior to or in conjunction with transferring the sleeved tray into the pallet.

12. The method of claim 9, wherein scanning, with one or more scanners, one or more of: the mail item identifier, the tray identifier, and the pallet identifier includes:
    scanning the pallet identifier prior to or in conjunction with transferring the pallet to a vehicle.

13. The method of claim 9, further comprising:
    storing information received from the one or more scanners regarding the one or more of: the mail item identifier, the tray identifier, and the pallet identifier; and
    sending the information received from the one or more scanners to a remote server for purposes of ensuring the actual physical mail matches the digital files submitted to USPS for postage discounts of same mail.

14. The method of claim 13, further comprising:
    at the remote server, comparing the stored information regarding the mail item identifier, the tray identifier, and the pallet identifier with the stored information received from the one or more scanners; and
    identifying whether or not any discrepancies exist between the stored information regarding the mail item identifier, the tray identifier, and the pallet identifier and the stored information received from the one or more scanners.

15. A mail tray tagging device, comprising:
    a robotic arm;
    an end-of-arm tool disposed at a movable end of the robotic arm, the end-of-arm tooling further including a scanner, the scanner configured to scan a mail item identifier for at least one mail item of the two or more mail items in the tray; and
    a printer configured to apply a tag to the tray, the tag including a tray identifier based upon the mail item identifier scanned by the scanner.

* * * * *